United States Patent
Swamy et al.

(10) Patent No.: US 11,797,902 B2
(45) Date of Patent: Oct. 24, 2023

(54) PROCESSING DATA UTILIZING A CORPUS

(71) Applicant: Accenture Global Solutions Limited, Dublin (IE)

(72) Inventors: Jayant Swamy, Bangalore (IN); Brajesh De, Bangalore (IN); Unmesh Salgaonkar, Chennai (IN); Dhanashree Dalal, Pune (IN); Sanjeev Vohra, Bangalore (IN); Sankar Natarajan, Chennai (IN); Anitha Nayar, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 885 days.

(21) Appl. No.: 16/435,785

(22) Filed: Jun. 10, 2019

(65) Prior Publication Data

US 2020/0160190 A1    May 21, 2020

(30) Foreign Application Priority Data

Nov. 16, 2018   (IN) .............................. 201841043226

(51) Int. Cl.
*G06F 40/279*   (2020.01)
*G06F 40/49*    (2020.01)
*G06N 20/00*    (2019.01)
*G06Q 10/0637*  (2023.01)
*G06N 5/022*    (2023.01)
(Continued)

(52) U.S. Cl.
CPC ....... *G06Q 10/0637* (2013.01); *G06F 18/217* (2023.01); *G06F 18/2148* (2023.01); *G06F 18/2415* (2023.01); *G06F 40/279* (2020.01); *G06F 40/49* (2020.01); *G06N 5/022* (2013.01); *G06N 20/00* (2019.01)

(58) Field of Classification Search
CPC ...... G06N 5/022; G06N 20/00; G06F 40/279; G06F 40/49
See application file for complete search history.

(56) References Cited

U.S. PATENT DOCUMENTS 7,593,904 B1    9/2009  Kirshenbaum et al.
10,248,648 B1 *  4/2019  Thomas ................ G06F 40/211
(Continued)

FOREIGN PATENT DOCUMENTS

AU   2019219820 A1   3/2020
EP      3318974 A2   5/2018
WO   2016049437 A1   3/2016

*Primary Examiner* — Bryan S Blankenagel
(74) *Attorney, Agent, or Firm* — Harrity & Harrity, LLP

(57) ABSTRACT

A device may receive data stored in one or more data sources associated with an organization based on utilizing one or more data discovery-related application programming interfaces (APIs) to access the data. The device may process, utilizing one or more data feature models via the one or more data discovery-related APIs, the data received from the one or more data sources to identify types of data included in the data based on a contextualization of the data. The one or more data feature models may identify a respective set of attributes expected to be included in the types of data. The device may perform multiple analyses of the data after identifying the types of data. The device may determine, based on a result of the multiple analyses, a score for the data. The device may perform one or more actions based on a respective result of the multiple analyses.

20 Claims, 14 Drawing Sheets

(51) Int. Cl.
*G06F 18/21* (2023.01)
*G06F 18/214* (2023.01)
*G06F 18/2415* (2023.01)

(56) References Cited

U.S. PATENT DOCUMENTS

| | | |
|---|---|---|
| 10,521,419 B1 | 12/2019 | Swamy et al. |
| 2004/0083199 A1 | 4/2004 | Govindugari et al. |
| 2008/0091705 A1 | 4/2008 | McBride et al. |
| 2008/0172407 A1 | 7/2008 | Sacks |
| 2008/0275916 A1* | 11/2008 | Bohannon ............... G06Q 30/06 |
| 2011/0087985 A1 | 4/2011 | Buchanan et al. |
| 2012/0084325 A1 | 4/2012 | Bansode et al. |
| 2012/0102002 A1 | 4/2012 | Sathyanarayana et al. |
| 2013/0073531 A1 | 3/2013 | Robinson et al. |
| 2014/0032506 A1 | 1/2014 | Hoey et al. |
| 2014/0324801 A1 | 10/2014 | McGraw et al. |
| 2015/0134591 A1 | 5/2015 | Staeben et al. |
| 2015/0186807 A1 | 7/2015 | Scriffignano et al. |
| 2015/0220835 A1 | 8/2015 | Wilson et al. |
| 2015/0278335 A1 | 10/2015 | Opitz et al. |
| 2015/0286828 A1 | 10/2015 | Bulumulla et al. |
| 2015/0356463 A1 | 12/2015 | Overell et al. |
| 2016/0070725 A1 | 3/2016 | Marrelli et al. |
| 2016/0323767 A1 | 11/2016 | Abdullah et al. |
| 2017/0277841 A1* | 9/2017 | Shankar ................. G16Z 99/00 |
| 2017/0329957 A1 | 11/2017 | Vepa et al. |
| 2017/0372232 A1* | 12/2017 | Maughan ............... G06F 3/0482 |
| 2018/0032216 A1 | 2/2018 | Naous et al. |
| 2018/0039501 A1 | 2/2018 | Jain et al. |
| 2019/0050597 A1* | 2/2019 | Barday ................. G06F 16/951 |
| 2020/0036515 A1* | 1/2020 | Chari ..................... H04L 9/0637 |
| 2020/0065736 A1* | 2/2020 | Relangi ................. G06N 20/20 |
| 2020/0151243 A1* | 5/2020 | Chauhan ................ G06F 3/048 |
| 2021/0271809 A1* | 9/2021 | Huang .................... G06N 5/04 |

* cited by examiner

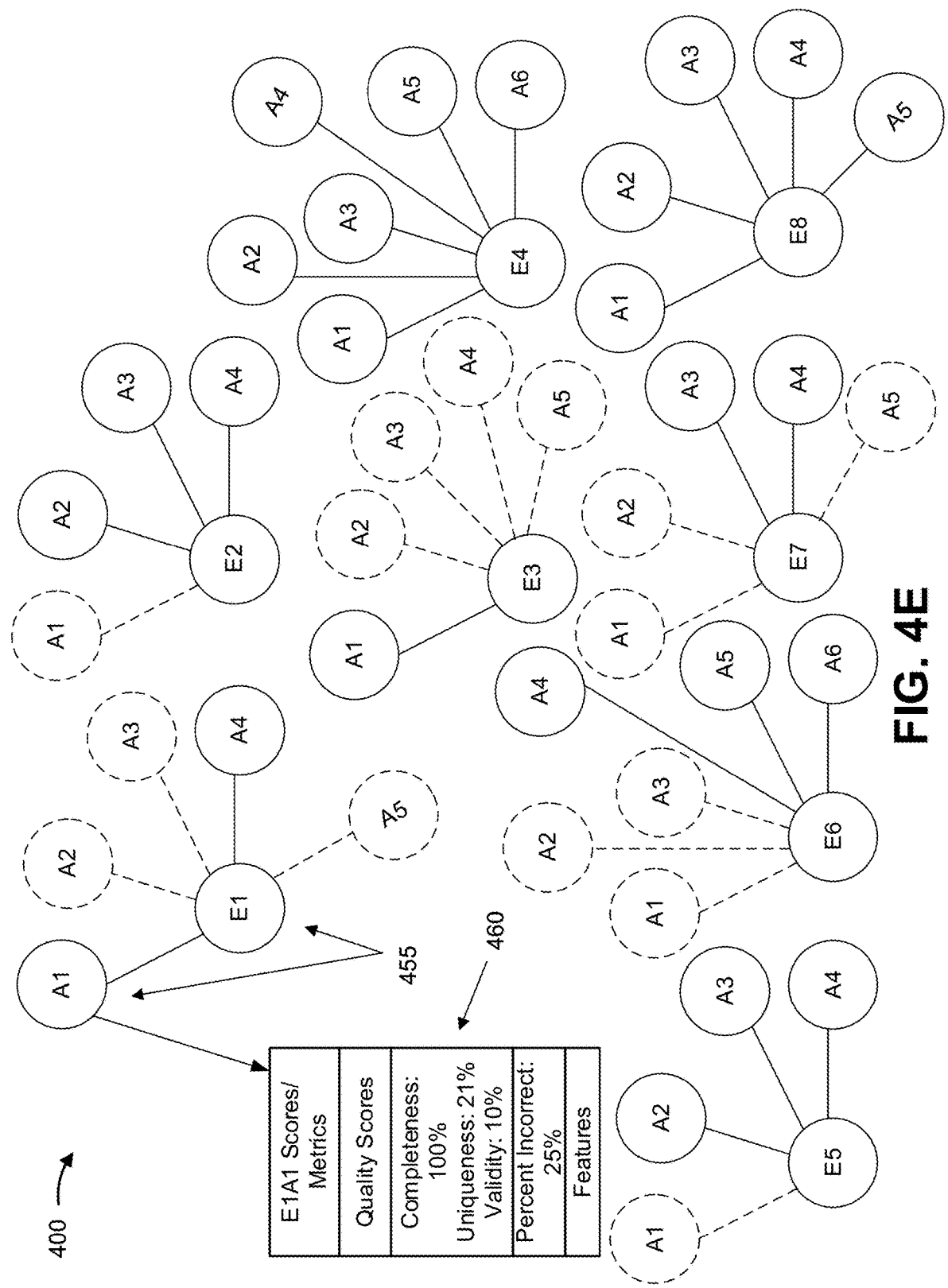

PROCESSING DATA UTILIZING A CORPUS

RELATED APPLICATION

This application claims priority under 35 U.S.C. § 119 to Indian Patent Application No. 201841043226, filed on Nov. 16, 2018, and entitled "PROCESSING DATA UTILIZING A CORPUS," the content of which is incorporated by reference herein in its entirety.

BACKGROUND

An organization generates data related to operations of the organization. For example, the organization generates data related to individuals associated with the organization, activities of the organization, and/or products and/or services associated with the organization. The data is stored across multiple data sources and/or is formatted in a particular manner. For example, the data is stored in a server device and/or has particular types of attributes.

SUMMARY

According to some implementations, a method may include accessing, based on a backend-as-a-service (BaaS) platform application programming interface (API), one or more data sources associated with an organization, and receiving, based on the BaaS platform, data stored in the one or more data sources after accessing the one or more data sources; processing, by the device and utilizing one or more data feature models, the data received from the one or more data sources to identify types of data included in the data based on a contextualization of the data to at least one of: the organization, an industry associated with the organization, or various industries or organizations; performing, by the device and after identifying the types of data included in the data, multiple analyses of the data utilizing at least one of: the one or more data feature models, one or more machine learning models, or one or more corpuses related to the data, wherein the multiple analyses include: a first analysis of a completeness of the data, a second analysis of a uniqueness of the data, a third analysis of an accuracy of the data, and a fourth analysis of a validity of the data; and performing, by the device, one or more actions based on a respective result of the multiple analyses.

According to some implementations, a device, may comprise: one or more memories; and one or more processors, communicatively coupled to the one or more memories, to: receive data stored in one or more data sources associated with an organization based on utilizing one or more data discovery-related application programming interfaces (APIs) to access the data; process, utilizing one or more data feature models via the one or more data discovery-related APIs, the data received from the one or more data sources to identify types of data included in the data based on a contextualization of the data, wherein the one or more data feature models identify a respective set of attributes expected to be included in the types of data included in the data; perform multiple analyses of the data after identifying the types of data included in the data, wherein the multiple analyses include: a first analysis of a completeness of the data, a second analysis of a uniqueness of the data, a third analysis of an accuracy of the data, and a fourth analysis of a validity of the data; determine, based on a result of the multiple analyses, a score for the data, wherein the score identifies at least one of: the completeness of the data, the uniqueness of the data, the accuracy of the data, or the validity of the data; and perform one or more actions based on a respective result of the multiple analyses.

According to some implementations, a non-transitory computer-readable medium may store instructions, the instructions comprising: one or more instructions that, when executed by one or more processors, cause the one or more processors to: receive data stored in one or more data sources associated with an organization; process, utilizing one or more data feature models, the data received from the one or more data sources to identify types of data included in the data; perform, after identifying the types of data included in the data, one or more contextualized analyses of the data utilizing at least one of: the one or more data feature models, one or more machine learning models, or one or more corpuses related to the data; determine a respective value for each of one or more metrics related to the data based on a result of the one or more contextualized analyses; determine a score for the data based on the respective value for the each of the one or more metrics, wherein the score identifies a quality of the data based on at least one of: a completeness of the data, a uniqueness of the data, an accuracy of the data, or a validity of the data; and perform one or more actions based on a respective result of the one or more contextualized analyses.

DETAILED DESCRIPTION

Figure 1:
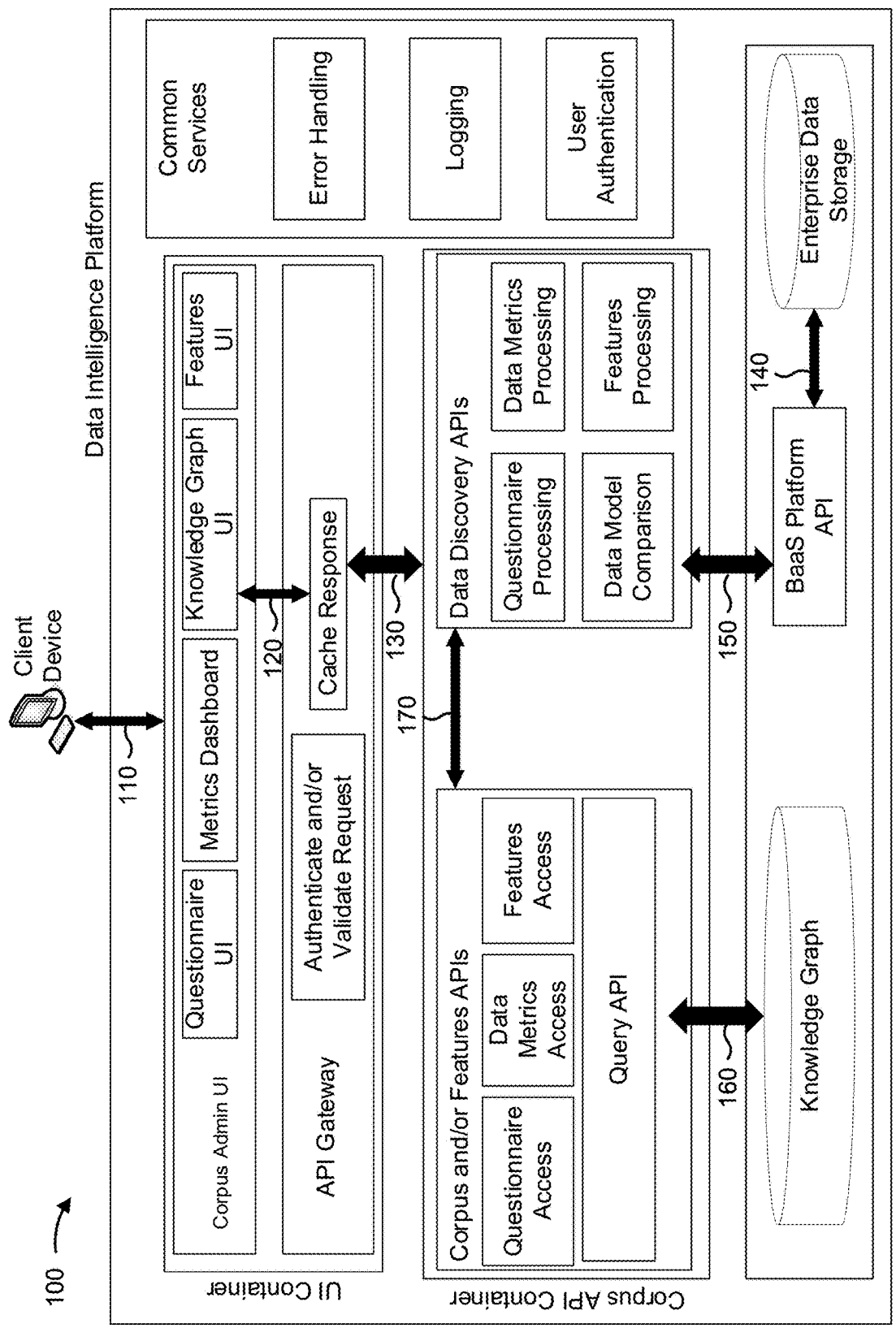
FIGS. 1-5 are diagrams of example implementations described herein.

The following detailed description of example implementations refers to the accompanying drawings. The same reference numbers in different drawings may identify the same or similar elements.

An organization generates data related to operations of the organization. For example, an organization may generate millions, billions, or more data elements related to the operations of the organization from various sources, such as manual feeds, sensors, Internet of Things (IoT) devices, operational processes, social media applications and/or the like. The data may be stored across hundreds, thousands, or more data sources, in a structured or unstructured form, that are located on premises of the organization, that are cloud based (e.g., spread across various geographic locations), that are located at third-party premises, and/or the like. In addition, the organization may generate the data at a rate of thousands, millions, or more data elements per day. These factors may significantly impair the organization's capability to understand the data that the organization is generating, the locations where the data is being stored, the manners in which the organization is using the data, and/or the like. In addition, these factors may significantly impair the organization's capability to correct data elements due to issues associated with the data, such as an issue related to a value of the data (e.g., a value outside of an acceptable value range), a format of the data (e.g., mis-formatted data), a storage location of the data (e.g., a device, a data center, and/or the like), and/or the like.

Some implementations described herein provide a data intelligence platform that is capable of performing data discovery of data generated by an organization (e.g., types of data generated by the organization, formats of the data, sources of the data, and/or the like) and/or storage locations of the data utilizing one or more machine learning techniques, by identifying patterns of attributes associated with different types of data, and/or the like. In addition, the data intelligence platform may analyze the data to identify an issue related to the data (e.g., an issue related to a completeness, an accuracy, a consistency, a validity, and/or the like of the data), performing an action to fix the issue, and/or the like. In this way, the data intelligence platform provides a tool that can be used to provide an organization with insight into data generated by the organization and/or to improve the data, in a manner not previously possible. This reduces an amount of time and/or computing resources needed to perform data discovery with regard to data generated by an organization, thereby improving an efficiency of performing data discovery related to the organization. In addition, this improves a quality of the data, thereby conserving processing resources that would otherwise be consumed processing data that includes an issue. Further, this facilitates cross-industry and/or cross-organizational data discovery and/or analysis of data in a manner not previously possible.

In this way, several different stages of the process for performing data discovery and/or identifying an issue associated with data are automated, thereby removing human subjectivity and waste from the process, and improving speed and efficiency of the process and conserving computing resources (e.g., processor resources, memory resources, and/or the like). Furthermore, implementations described herein use a rigorous, computerized process to perform tasks or roles that were not previously performed using subjective human intuition or input. For example, currently there does not exist a technique to perform data discovery of types of data generated by an organization and/or a location where the data is stored. Finally, automating the process for performing data discovery and/or identifying an issue included in the data conserves computing resources (e.g., processor resources, memory resources, and/or the like) that would otherwise be wasted in attempting to perform data discovery and/or to identify an issue included in the data, and computing resources of a device that would otherwise be wasted processing data that includes an issue.

FIG. 1 is a diagram of an example implementation 100 described herein. As shown in FIG. 1, implementation 100 includes a client device and a data intelligence platform.

As shown by reference number 110, a user of the client device may access the data intelligence platform via use of a user interface (UI) container associated with the data intelligence platform. For example, the UI container may provide various UIs for display (e.g., via which the user of the client device can interact with the data intelligence platform), may use various application programming interfaces (APIs) to cause one or more elements and/or components of the data intelligence platform to perform tasks based on interactions of the user of the client device with the UIs, to provide information for display via a display associated with the client device and/or the data intelligence platform, and/or the like.

In some implementations, and as shown in FIG. 1, the UI container may include a corpus admin UI that provides the user of the client device with a capability to cause the data intelligence platform to perform actions related to one or more corpuses, one or more data feature models, and/or the like (described elsewhere herein) stored by the data intelligence platform. For example, the corpus admin UI may provide one or more questionnaire-related UIs and/or capabilities (shown as "Questionnaire UI") that the user can use to generate questionnaires related to data generated by an organization for individuals associated with the organization, to view responses to the questionnaires (e.g., responses that include text input via a UI associated with a questionnaire, that include selection of a UI element, such as a button, a toggle, a drop-down menu selection, and/or the like, that include audio input into an input component associated with the data intelligence platform and/or a client device, such as a microphone and/or a headset, and/or the like), and/or the like.

Additionally, or alternatively, and as another example, the corpus admin UI may provide a metrics dashboard (shown as "Metrics Dashboard") that the user can use to view values of various metrics and/or scores related to data associated with an organization (e.g., a completeness score that identifies a determined completeness of the data, a uniqueness score that identifies a determined uniqueness of the data, an accuracy score that identifies a determined accuracy of the data, a validity score that identifies a determined validity of the data, and/or the like), to generate reports related to the values of the metrics and/or the scores, to perform various analyses of the values and/or the scores, and/or the like.

Additionally, or alternatively, and as another example, the corpus admin UI may provide one or more knowledge graph-related UIs and/or capabilities (e.g., shown as "Knowledge Graph UI") that the user can use to view models stored in a knowledge graph, such as OrientDB®, (e.g., data features models used to perform data discovery and/or to perform analyses of the data), to edit the models, to view data stored in the knowledge graph, and/or the like. Additionally, or alternatively, and as another example, the corpus admin UI may provide one or more data features-related UIs and/or capabilities (e.g., shown as "Features UI") that the user can use to cause the data intelligence platform to use one or more data feature models to perform data discovery of data and/or to perform one or more analyses of the data, to edit a data feature model, and/or the like.

In some implementations, a knowledge graph may include a graph database that uses graph structures with nodes, edges, and properties to represent and store data. For example, the relationships may facilitate data in the knowledge graph to be linked together.

In some implementations, and as shown by reference number 120, the corpus admin UI may communicate with an API gateway. For example, the corpus admin UI may communicate with the API gateway in association with providing a UI for display, based on a user interaction with a UI, to access a service provided by the API gateway in association with performing a function described above, and/or the like. In some implementations, the API gateway may provide connectivity to one or more elements and/or components of the data intelligence platform, may perform services related to functionality and/or capabilities of the corpus admin UI, and/or the like. For example, the API gateway may perform services related to authenticating and/or validating a request from the user of the client device (e.g., shown as "Authenticate and/or Validate Request"), such as a request to view and/or edit a data feature model, a request that the data intelligence platform perform data discovery and/or an analysis of data associated with an organization, and/or the like.

Additionally, or alternatively, and as another example, the API gateway may perform services related to caching responses from one or more elements and/or components of the data intelligence platform (e.g., shown as "Cache Response"), such by caching data feature models that are being viewed and/or edited, caching data that is being analyzed via the metrics dashboard, and/or the like. This reduces a need to repeatedly request information that is to be provided for display to the user during a usage session of the data intelligence platform, thereby conserving processing resources, time, and/or the like that would otherwise be consumed due to repeated requests.

As shown by reference number 130, the UI container (e.g., via the cache response services) may communicate with a corpus API container included in the data intelligence platform. For example, the corpus API container may provide various APIs and/or services related to one or more corpuses stored by the data intelligence platform, related to performing data discovery of data associated with an organization, related to performing various analyses of data associated with an organization, and/or the like. In some implementations, the corpus API container may include a set of corpuses and/or features APIs (e.g., shown as "Corpus and/or Features APIs") related to accessing and/or utilizing a set of corpuses, a set of data feature models, data associated with an organization, and/or the like stored in the knowledge graph. Additionally, or alternatively, the corpus API container may include a set of data discovery APIs related to performing data discovery of data associated with an organization and/or performing various analyses of the data (e.g., utilizing the set of corpuses, the set of data feature models, and/or the like). For example, the corpus API container may use the corpus and/or features APIs to access a corpus, a data feature model, and/or the like and/or to provide the corpus, the data features model, and/or the like to data discovery APIs (described below) so that the data discovery APIs can perform data discovery and/or various analyses of data associated with an organization.

As further shown in FIG. 1, the data intelligence platform may utilize a set of common services. For example, the data intelligence platform may utilize a set of common services, such as an error handling service (e.g., shown as "Error Handling"), a logging service (e.g., shown as "Logging"), a user authentication service (e.g., shown as "User Authentication"), and/or the like across the UI container, the corpus API container, and/or one or more other elements and/or components of the data intelligence platform.

Reference numbers 140 through 170 describe data discovery and/or analyses of data that the data intelligence platform may perform with respect to data associated with an organization. For example, the data intelligence platform may perform data discovery by identifying types of data associated with the organization, formats of the data, sources of the data, storage locations of the data, and/or the like utilizing one or more machine learning techniques (e.g., using one or more machine learning models), by identifying patterns of attributes associated with different types of data (e.g., using one or more data feature models), and/or the like. Additionally, or alternatively, and as another example, the data intelligence platform may perform various analyses related to completeness of the data (e.g., whether data associated with the organization includes records that are predicted to be included), uniqueness of the data (e.g., whether unique records in the data are associated with unique identifiers), accuracy of the data (e.g., whether the data is within an expected range of values, whether the same data in different storage locations has the same values, and/or the like), validity of the data (e.g., whether the data is in a correct format), and/or the like.

As shown by reference numbers 140 and 150, the data intelligence platform may utilize a backend-as-a-service (BaaS) platform (e.g., DreamFactory™) to access and/or receive data associated with an organization from an enterprise data storage location (e.g., shown as "Enterprise Data Storage"). For example, the data intelligence platform may access, utilizing the data discovery APIs and/or a BaaS platform API (e.g., DreamFactory™ APIs) associated with the BaaS platform, the enterprise data storage location and may receive, utilizing the data discovery APIs and/or the BaaS platform API, the data from the enterprise data storage location. In some implementations, the data intelligence platform may access and/or receive the data based on receiving input from a user of the client device to perform data discovery of data stored in the enterprise data storage location.

Although FIG. 1 shows a single enterprise data storage location, in practice the data intelligence platform may access data in and/or receive data from hundreds, thousands, or more enterprise data storage locations associated with hundreds, thousands, or more organizations. In this way, the data intelligence platform may perform data discovery in a manner that cannot be performed manually or objectively by a human actor. In some implementations, the data intelligence platform may perform data discovery and/or a set of analyses on data associated with an organization, and the data intelligence platform may copy the data to a storage location different from the enterprise data storage. This reduces or eliminates interruption to the organization's use of the data during performance of data discovery and/or the set of analyses. In addition, this prevents computing devices associated with the organization from being overloaded during performance of the data discovery and/or the set of analyses.

As shown by reference number 160, after or in association with accessing and/or receiving the data from the enterprise data storage, the data intelligence platform may utilize the corpus and/or features APIs to access a set of data feature models, a set of corpuses, and/or the like stored in the knowledge graph. For example, the data intelligence platform may access the knowledge graph utilizing a query API that provides the data intelligence platform with the capability to query a set of data feature models, a set of corpuses, and/or the like from the knowledge graph (e.g., utilizing Gremlin queries).

In some implementations, the data intelligence platform may utilize one or more corpuses to process the data to perform data discovery and/or an analysis with regard to the data, to identify an issue related to the data, and/or the like. For example, a corpus may include a common corpus, an industry corpus, an organization corpus, and/or the like, as described elsewhere herein. In some implementations, a corpus may include information that identifies formatting rules for data, value ranges for data, acceptable tolerances for accuracy of data, attributes (e.g., rows and/or columns) that are expected to be included in the data, data elements that are expected to be included in the data, metadata that is expected to be associated with the data, and/or the like.

In some implementations, the knowledge graph may store a common corpus related to various industries and/or organizations. For example, the common corpus may include information related to data that is common across various industries and/or organizations, such as rules related to formatting of data, attributes included in the data, and/or the like that are common across various industries and/or organizations.

Additionally, or alternatively, the knowledge graph may store an industry corpus related to an industry associated with the organization. For example, the industry corpus may include information related to data that is common across a particular industry, such as rules related to formatting of data, attributes included in the data, and/or the like. In some implementations, the knowledge graph may store dozens, hundreds, or more industry corpuses that can be used to analyze data related to organizations operating in dozens, hundreds, or more industries. In this way, the data intelligence platform may be configured and/or customized to process data in a contextualized manner for various industries.

Additionally, or alternatively, the knowledge graph may store an organization corpus related to an organization. The organization corpus may, for example, include information related to data associated with a particular organization, such as rules related to formatting of data, attributes included in the data, and/or the like associated with the particular organization. In some implementations, the knowledge graph may store hundreds, thousands, or more organization corpuses that can be used to analyze data related to hundreds, thousands, or more organizations. In this way, the data intelligence platform may be configured and/or customized to process data in a contextualized manner for various organizations. In this way, the data intelligence platform, utilizing one or more corpuses, can provide a customizable analysis of data in a manner not previously possible (e.g., contextualized by industry, by organization, and/or the like).

In some implementations, a data feature model may identify a respective set of attributes to be included in different types of data. For example, different types of data (e.g., sales data, employee data, data from organizations in different industries, and/or the like) may have different attributes included in the data (e.g., address data may include attributes such as a location number, a street name, a street type, a city, a state, and a postal code, while employee data may include attributes such as a name of an employee, an identifier for the employee, a job title of the employee, and an office location of the employee).

In some implementations, a data feature model may include a machine learning model that has been trained to analyze data to determine whether the data includes particular attributes. For example, the machine learning model may be trained to identify variations in identifiers used for different attributes (e.g., the machine learning model may identify the same attribute in different data sets when different attribute names, formats and/or the like are used across the different data sets), may be contextualized to an organization and/or an industry (e.g., may be trained on specific attributes, names of attributes, formats of data associated with various attributes, and/or the like for a particular organization and/or industry), and/or the like.

In some implementations, the machine learning model may have been trained on a training set of data. For example, the machine learning model may have been trained on a training set of data that includes various subsets of data and information that identifies corresponding attributes of the various subsets of data, that identifies a mapping between attributes of the various subsets of data, and/or the like. For example, the training set of data may include a first data set (e.g., with a first format, a first set of names for attributes included in the data, and/or the like), a second data set (e.g., with a second format, a second set of names for attributes included in the data, and/or the like) and information that identifies a mapping between attributes of the first data set and attributes of the second data set (e.g., to train the machine learning model to recognize the same attributes in different data sets, regardless of differences in format, names, and/or the like of the attributes across the different data sets). In some implementations, the data intelligence platform may utilize multiple machine learning models which may be associated with different organizations, different industries, and/or the like (e.g., which may have been trained on data associated with the different organizations, the different industries, and/or the like). This improves an accuracy of performing data discovery by improving a capability of the data intelligence platform to identify variations in attributes across different data sets.

In some implementations, the data intelligence platform may portion a set of data from the enterprise data storage into a training set, a validation set, a test set, and/or the like. In some implementations, the data intelligence platform may train a machine learning model described herein using, for example, a factorization machine, a random forest, gradient boosting, and/or the like, and based on the training set of the data.

In some implementations, the training set of data may be organization and/or industry specific (e.g., specific for the organization and/or industry of the organization with which the data intelligence platform is associated). This provides more accurate identification of types of data associated with an organization based on characteristics of the data that are specific to the organization and/or an industry associated with the organization. Additionally, or alternatively, the training set of data may be cross-organizational (e.g., may include data for various organizations other than the organization with which the data intelligence platform is associated). This provides the data intelligence platform with the capability to identify different types of data, to identify the same type of data regardless of deviations in format, attributes, and/or the like included in data, and/or the like.

In some implementations, training of the machine learning model may include supervised training. For example, a user of the data intelligence platform may manually classify data to train the machine learning model. This may increase an accuracy of training of the machine learning model and/or may reduce an amount of time needed to train the machine learning model.

In some implementations, the data intelligence platform may use a factorization machine technique to train a machine learning model. For example, the factorization machine technique may train the machine learning model on features included in a data set. Additionally, or alternatively, the data intelligence platform may use a random forest technique to train a machine learning model. For example, the data intelligence platform may use the random forest technique to train the machine learning model by constructing multiple decision trees from the data. Additionally, or alternatively, the data intelligence platform may train the machine learning model using a gradient boosting technique. For example, the data intelligence platform may use the gradient boosting technique to generate a prediction model based on a data set.

In some implementations, the data intelligence platform may use a logistic regression classification technique to determine a categorical outcome (e.g., attributes included in data associated with an organization, a type of the data based on the attributes, and/or the like). Additionally, or alternatively, the data intelligence platform may use a naïve Bayesian classifier technique. In this case, the data intelligence platform may perform binary recursive partitioning to split the data of the minimum feature set into partitions and/or branches, and may use the partitions and/or branches to perform predictions (e.g., that data includes particular attributes, that the data is a particular type of data, and/or the like). Based on using recursive partitioning, the data intelligence platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the data intelligence platform may use a support vector machine (SVM) classifier technique to generate a non-linear boundary between data points in the training set. In this case, the non-linear boundary is used to classify test data (e.g., data associated with an organization) into a particular class (e.g., a class associated with a particular set of attributes for data, a particular type of data, and/or the like).

In some implementations, rather than training a model, the data intelligence platform may receive a model from another device (e.g., a server device). For example, a server device may generate a model based on having trained the model in a manner similar to that described above and may provide the model to the data intelligence platform (e.g., may pre-load the data intelligence platform with the model, may receive a request from the data intelligence platform for the model, and/or the like). In some implementations, the data intelligence platform may perform a lookup to identify a model for data associated with an organization. For example, the data intelligence platform may perform a lookup of a model associated with an organization, an industry, and/or the like associated with the data. In other words, the data intelligence platform may utilize various models to identify attributes associated with a data set, thereby increasing an accuracy of identifying the set of parameters.

In some implementations, output from the model may identify a set of attributes included in data associated with an organization, types of data associated with an organization. For example, the output may identify that the data includes address data (e.g., with attributes such as house number, street name, city, state, postal code, and/or the like), employee data (e.g., with attributes such as name, employee identifier, email address, office location, and/or the like), and/or the like.

In some implementations, and as further shown with respect to reference number 160, the data intelligence platform may use the corpus API container to access, in the knowledge graph, a set of questionnaires and/or to generate, from a set of questions stored in the knowledge graph, a questionnaire to be provided to a user of the data intelligence platform (e.g., via a questionnaire API, shown as "Questionnaire Access"). For example, the knowledge graph may store a set of questions for a questionnaire and/or a set of questionnaires related to practices of the organization with regard to maintaining data associated with the organization, governance of the data associated with the organization, and/or the like. In some implementations, the data intelligence platform may select a questionnaire and/or questions to be included in a questionnaire from the knowledge graph. For example, the data intelligence platform may select the questions and/or the questionnaire in a contextualized manner (e.g., may select questions and/or a questionnaire that has been loaded into the knowledge graph specifically for the organization, for organizations in a particular industry, and/or the like). In some implementations, the data intelligence platform may utilize a machine learning model, similar to that described herein, to select questions and/or a questionnaire based on characteristics of the organization (e.g., a size of the organization, a location of the organization, goods and/or services provided by the organization, and/or the like), an industry of the organization, and/or the like.

In some implementations, after selecting and/or generating the questionnaire, the data intelligence platform may provide the questionnaire for display so that an individual associated with the organization can input answers to the questionnaire. In some implementations, and as described below, the data intelligence platform may process answers to the questionnaire to identify issues with practices of the organization related to data associated with the organization, to determine a score for the practices of the organization, and/or the like.

In some implementations, and as further shown with respect to reference number 160, the data intelligence platform may use the corpus API container to access, in the knowledge graph, a set of data metrics for which values are to be determined and/or which are to be used to analyze data associated with the organization (e.g., via a data metrics API, shown as "Data Metrics Access"). For example, the knowledge graph may store information identifying different data metrics (e.g., and manners in which to determine values for the data metrics) for which values can be determined and/or used to analyze data associated with an organization. In some implementations, the data intelligence platform may select a set of data metrics to be used to analyze data associated with an organization. For example, the data intelligence platform may select the data metrics in a contextualized manner (e.g., may select the set of data metrics based on the organization, an industry associated with the organization, and/or the like). In some implementations, the data intelligence platform may utilize a machine learning model, similar to that described herein, to select the set of data metrics based on characteristics of the organization (e.g., a size of the organization, a location of the organization, goods and/or services provided by the organization, and/or the like), based on characteristics of the industry (e.g., a size of the industry, and/or the like), and/or the like. In some implementations, after selecting the set of data metrics and as described below, the data intelligence platform may determine values for the set of data metrics and/or may perform an analysis of the values for the set of data metrics.

In some implementations, and shown by reference number 170, the data intelligence platform may utilize the corpus and/or features APIs and the data discovery APIs to process data associated with the organization. For example, the data discovery APIs may perform the processing based on information received from the corpus and/or features APIs to perform data discovery of data associated with the organization, to identify an issue associated with the data, and/or the like.

In some implementations, the data intelligence platform may process, utilizing one or more data feature models, the data received from the enterprise data storage to identify types of data included in the data. For example, data intelligence platform may utilize the corpus and/or features APIs to select a data feature model from the knowledge graph and may utilize the data discovery APIs to process the data from the enterprise data storage to identify the types of data stored in the enterprise data storage (e.g., by identifying combinations of attributes included in different data sets stored in the enterprise data storage). In some implementations, the data intelligence platform may process the data based on a contextualization of the data to at least one of the organization, an industry associated with the organization, various industries and/or organizations, and/or the like. For example, combinations of attributes included in a data feature model may be based on the organization, the industry, the various industries and/or organizations, and/or the like and processing the data utilizing the data feature model may contextualize the processing to the organization, to the industry, to the various organizations and/or industries, and/or the like.

In some implementations, the data intelligence platform may process the data by performing a comparison of first data features of the data and second data features included in the one or more data feature models. For example, the data intelligence platform may perform a comparison of attributes included in the data and attributes included in a data feature model to determine whether the data is of the same type as that on which the data feature model is based, to determine whether the data includes the same or similar attributes as the data feature model, and/or the like. In some implementations, the data intelligence platform may identify the types of data included in the data based on a result of the comparison of the first data features and the second data features. For example, the data intelligence platform may identify attributes included in the data and may identify a type of the data based on a match with respect to a mapping between different combinations of attributes and different types of data. Additionally, or alternatively, and as another example, the data intelligence platform may predict a type of the data based on attributes identified in the data. Continuing with the previous example, the data intelligence platform may use a machine learning model to predict a type of the data based on the attributes included in the data (e.g., based on a quantity and/or percentage of matching attributes between a data feature model and the data, based on a textual similarity between names of attributes included in the data feature model and included in the data, based on a formatting and/or values of the data, and/or the like).

In some implementations, the data intelligence platform may process one or more responses received for a questionnaire, such as to identify issues associated with data-related practices of an organization. For example, the data intelligence platform may process, utilizing the data discovery APIs, one or more responses received for the questionnaire using a natural language processing (NLP) technique. Continuing with the previous example, the data intelligence platform may process text input to a user interface, audio input via an input component associated with the data intelligence platform, and/or the like utilizing a natural language processing technique. Additionally, or alternatively, the data intelligence platform may process selections of one or more user interface elements (e.g., buttons, toggles, radio buttons, and/or the like) to process a response received for a questionnaire.

In some implementations, when processing the response using the natural language processing technique, the data intelligence platform may identify terms, phrases, and/or the like that identify data-related practices of the organization (e.g., after correcting typos in the response (or a transcript of the response for an audio response), removing stop words in the response, identifying nouns and/or verbs in the response, and/or the like). In some implementations, and as described elsewhere herein, the data intelligence platform may utilize the terms, phrases, and/or the like to determine whether the data-related practices match rules associated with the organization, an industry associated with the organization, various industries and/or organizations, and/or the like.

In this way, the data intelligence platform may process a response for a questionnaire in a manner different from that of a human actor and/or at a scale not possible by a human actor (e.g., via utilization of various trained models and/or data processing techniques).

In some implementations, the data intelligence platform may perform multiple analyses of the data. For example, the multiple analyses may include a first analysis of a completeness of the data (e.g., whether data elements are missing from the data), a second analysis of a uniqueness of the data (e.g., whether different records in the data are uniquely identified), a third analysis of an accuracy of the data (e.g., whether the values for the data include predicted values), a fourth analysis of a validity of the data (e.g., whether values for the data are within predicted ranges of values), and/or the like. In some implementations, the data intelligence platform may perform the multiple analyses utilizing the one or more data feature models, one or more machine learning models, and/or one or more corpuses related to the data. For example, the data intelligence platform may utilize a data feature model to determine whether the data includes predicted attributes based on the organization, an industry associated with the organization, and/or various industries and/or organizations (e.g., to determine whether the data is missing attributes that are predicted to be included in the data based on the type of the data).

Additionally, or alternatively, and as another example, the data intelligence platform may utilize a machine learning model, such as a pattern matching model, a fuzzy logic machine learning model, a fuzzy logic natural language processing machine learning model, and/or the like to process the data (e.g., to determine whether the data includes predicted values, includes values formatted in a predicted manner, and/or the like), to process a response received for a questionnaire (e.g., to determine whether the response describes a data-related practice that matches that predicted for the organization, for an industry, for various industries and/or organizations, and/or the like), and/or the like. Additionally, or alternatively, and as another example, the data intelligence platform may process the data based on a corpus (e.g., to determine whether a structure of the data, such as data elements included in the data, matches a predicted structure based on the organization, an industry, and/or various organizations and/or industries).

In some implementations, the data intelligence platform may determine the completeness of the data, the uniqueness of the data, the accuracy of the data, the validity of the data, and/or the like based on a result of utilizing the one or more data feature models, one or more machine learning models, and/or one or more corpuses related to the data. In some implementations, the data intelligence platform may determine a respective value for one or more metrics associated with the data based on the result of the multiple analyses. For example, the one or more metrics may be related to the completeness of the data, the uniqueness of the data, the accuracy of the data, and/or the validity of the data. Continuing with the previous example, the data intelligence platform may determine a respective value for metrics such as a quantity of missing data elements from the data, a percentage of unique values for a particular attribute included in the data, a quantity of data elements and/or a percentage of the data with inaccurate values, a quantity of data elements and/or a percentage of the data with improperly formatted values, and/or the like.

In some implementations, the data intelligence platform may determine a score based on a result of performing the multiple analyses. For example, the data intelligence platform may determine separate scores for the first analysis of the completeness of the data, the second analysis of the uniqueness of the data, the third analysis of the accuracy of the data, and/or the fourth analysis of the validity of the data. Continuing with the previous example, the data intelligence platform may determine separate scores that indicate the completeness of the data (e.g., a percentage of the data that is complete, a quantity of missing data elements and/or values for data elements, and/or the like), the uniqueness of the data (e.g., a percentage of the data that includes unique records, a percentage of identifiers that are unique, and/or the like), the accuracy of the data (e.g., a percentage of the data that is accurate, a percentage of the data that is inaccurate, and/or the like), the validity of the data (e.g., a percentage of the data with values within a predicted range, a percentage of the data that is properly formatted, and/or the like), and/or the like. In some implementations, the data intelligence platform may aggregate separate scores into a total score. For example, the data intelligence platform may sum the separate scores, may average the separate scores, may apply different weights to the separate scores, may process the separate scores using a function, and/or the like to determine a total score for the data (e.g., a total score that indicates a quality of the data, that indicates issues included in the data, and/or the like).

In some implementations, the data intelligence platform may perform one or more actions. For example, the data intelligence platform may perform one or more actions after performing the multiple analyses, based on scores determined for the multiple analyses, and/or the like. In some implementations, the data intelligence platform may generate a report based on the result of the multiple analyses (e.g., where the report includes information identifying the scores and/or results of the multiple analyses), and may provide the report for display via a display. In some implementations, the data intelligence platform may modify the data. For example, the data intelligence platform may modify the data to apply a uniform formatting to the data, may request a correction of the data from a user of the data intelligence platform, and/or the like. In some implementations, the data intelligence platform may provide the modified data to the enterprise data storage to replace the issue-containing data after modifying data. In this way, the data intelligence platform may replace data that includes an issue with corrected data, thereby improving a quality of the data.

In some implementations, the data intelligence platform may generate a set of recommendations for the data related to modifying the score associated with the data. For example, the data intelligence platform may generate a recommendation to re-format the data, to correct values for the data, to correct non-unique values for an attribute that is intended to include unique values, and/or the like so as to improve a score associated with the data. In some implementations, after generating the set of recommendations, the data intelligence platform may provide information that identifies the set of recommendations for display via a display, or may modify the data according to the set of recommendations to modify the score.

In this way, the data intelligence platform may perform data discovery of data associated with an organization and/or may improve the data. This improves a functioning of devices that use the data by reducing and/or eliminating waste of computing resources that would otherwise occur due to the data including an issue. In addition, this facilitates insight into data associated with an organization in a manner not previously possible by facilitating discovery of millions, billions, or more data elements across hundreds, thousands, or more data storage locations.

As indicated above, FIG. 1 is provided merely as an example. Other examples may differ from what was described with regard to FIG. 1.

Figure 2:
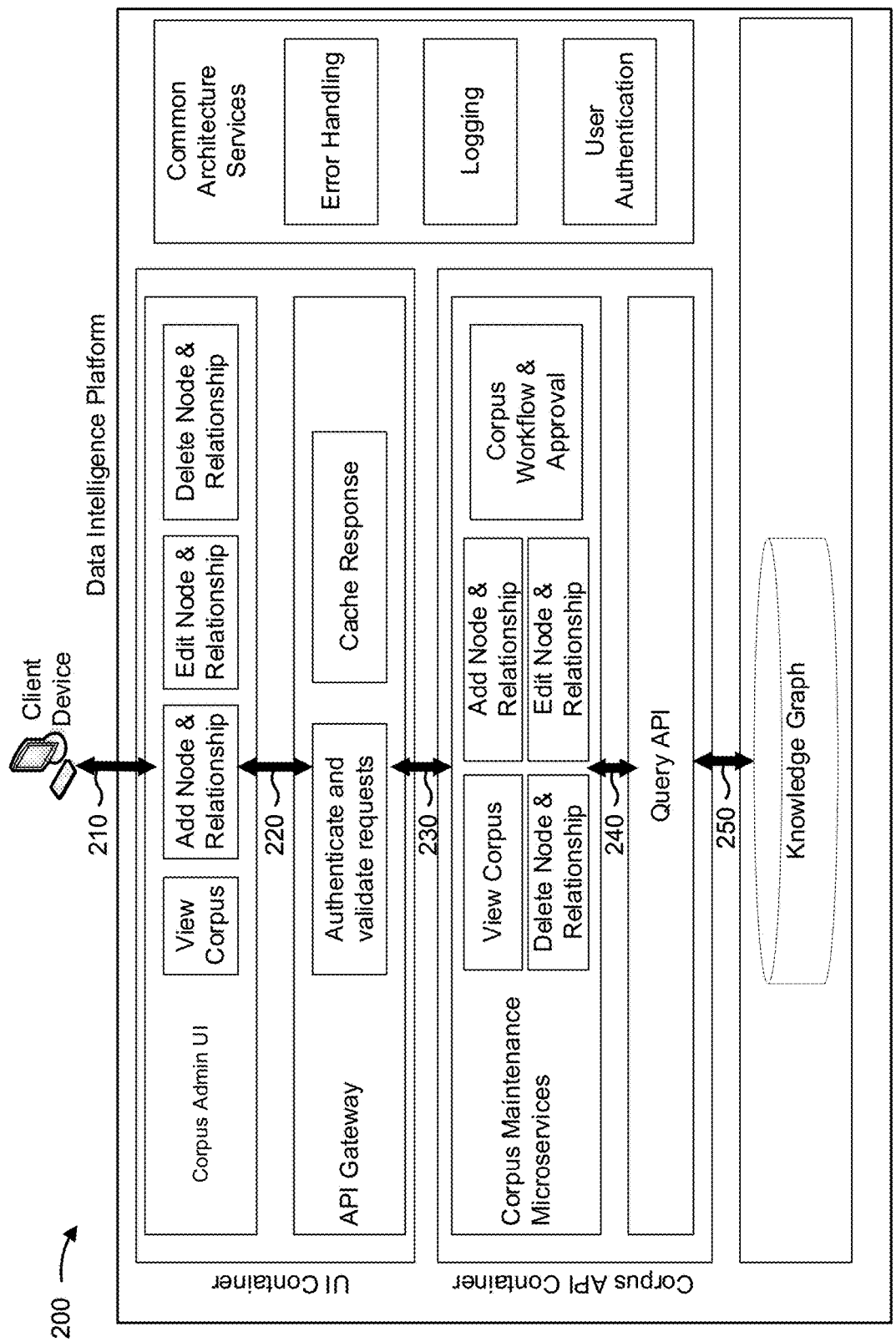

FIG. 2 is a diagram of an example implementation 200 described herein. FIG. 2 shows an example architecture of a data intelligence platform related to creating, updating, and/or maintaining a knowledge graph (e.g., a set of corpuses stored in the knowledge graph, a set of data feature models stored in the knowledge graph, and/or the like).

As shown by reference number 210, a user of the data intelligence platform may access the data intelligence platform via a corpus admin UI, in a manner similar to that described elsewhere herein (e.g., to access the functions of the data intelligence platform described elsewhere herein). For example, the user may access the data intelligence platform via the corpus admin UI to view one or more corpuses stored in the knowledge graph (shown as "View Corpus"), to add information to a corpus and/or to a data feature model (shown as "Add Node & Relationship"), to edit or modify an existing corpus and/or a data feature model (shown as "Edit Node & Relationship"), to delete information associated with a corpus and/or a data feature model (shown as "Delete Node & Relationship"), and/or the like.

As shown by reference number 220 the corpus admin UI may communicate with an API gateway, in a manner that is the same as or similar to that described elsewhere herein. For example, the corpus admin UI may communicate with the API gateway in association with providing a UI for display, based on a user interaction with the UI, to access a service provided by the API gateway in association with performing a function described above, and/or the like. As shown by reference number 230, the API gateway may communicate with a corpus API container to utilize various corpus maintenance microservices implemented by the corpus API container. For example, the corpus maintenance microservices may perform various functions related to modifying and/or maintaining information stored in the knowledge graph (e.g., related to modifying and/or maintaining a set of corpuses stored in the knowledge graph, a set of data feature models stored in the knowledge graph, and/or the like).

As shown by reference number 240, the corpus maintenance microservices may utilize a query API to access information stored in the knowledge graph. For example, the corpus maintenance microservices may utilize the query API to query one or more corpuses, one or more data feature models, and/or the like from the knowledge graph (e.g., so that a user of the data intelligence platform can modify, delete, use, and/or the like the one or more corpuses, the one or more data feature models, and/or the like). Additionally, or alternatively, the corpus maintenance microservice may utilize a query API to store a new corpus, a new data feature model, and/or the like. As shown by reference number 250, the query API may provide access to the knowledge graph in a manner that is the same as or similar to that described elsewhere herein.

As indicated above, FIG. 2 is provided merely as an example. Other examples may differ from what was described with regard to FIG. 2.

Figure 3:
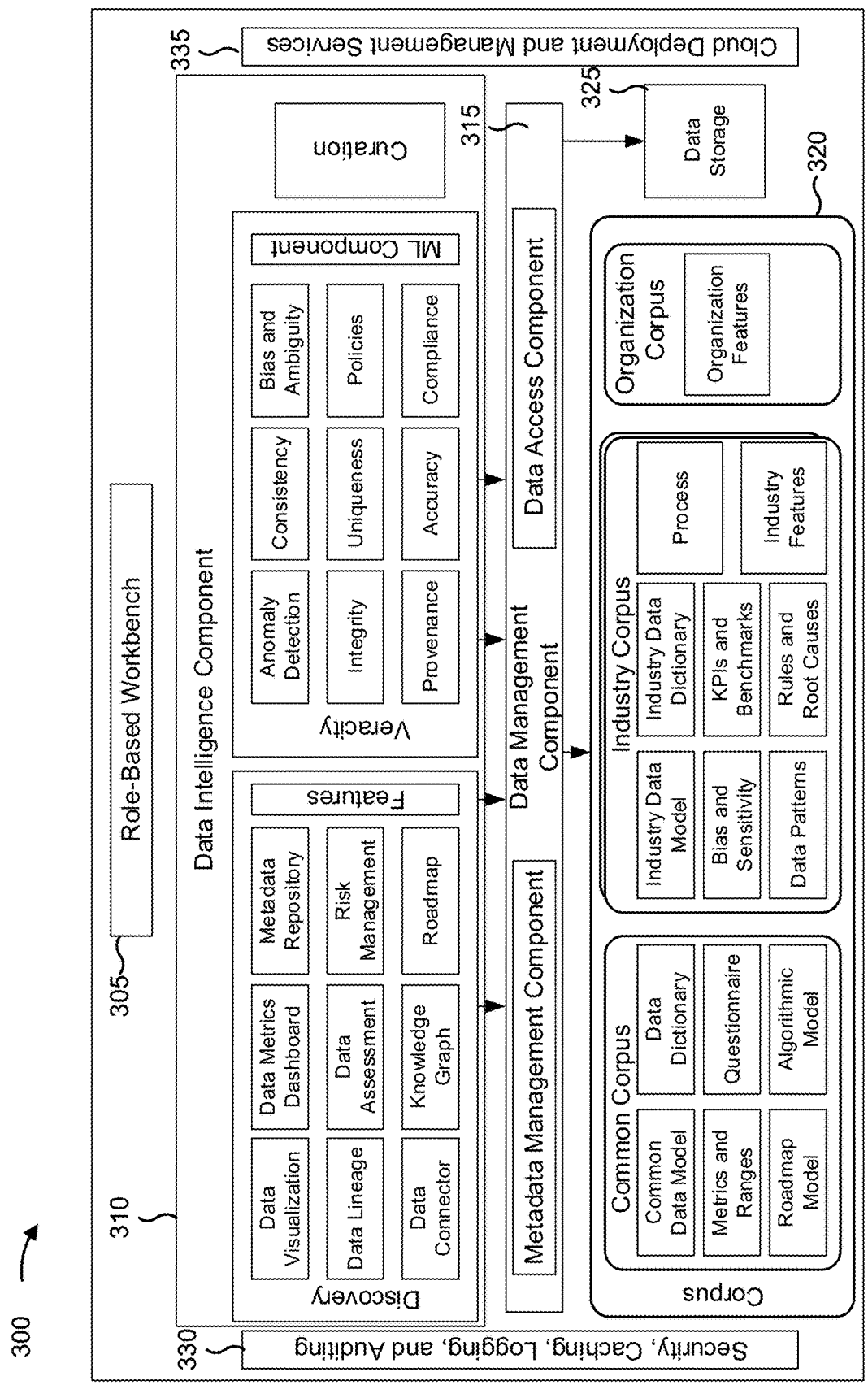

FIG. 3 is a diagram of an example implementation 300 described herein. As shown in FIG. 3, implementation 300 includes a data intelligence platform that is the same as or similar to that described elsewhere herein. FIG. 3 shows a detailed architecture of some of the components of the data intelligence platform described elsewhere herein.

As shown in FIG. 3, the data intelligence platform may include a role-based workbench component 305. For example, role-based workbench component 305 may implement a UI container described elsewhere herein. In some implementations, role-based workbench component 305 may be configured to control access to and/or use of the data intelligence platform (e.g., by facilitating login procedures, authentication procedures, and/or the like). For example, role-based workbench component 305 may provide a set of user interfaces that is associated with different roles that could access and/or use the data intelligence platform (e.g., an administrative role for an administrative user, an analyst role for an analyst user, a data scientist role for a data scientist user, an industry expert role for an industry expert user, and/or the like). Continuing with the previous example, different roles may be permitted to access different functionalities of the data intelligence platform, may have different authentication processes to access the data intelligence platform, and/or the like.

Additionally, or alternatively, and as another example, the set of user interfaces may be associated with various functionalities of the data intelligence platform. For example, a first subset of user interfaces may be associated with a first functionality, a second subset of user interfaces may be associated with a second functionality, and/or the like (e.g., the first subset of user interfaces may be associated with a discovery functionality, a second subset of user interfaces may be associated with a veracity functionality, a third subset of user interfaces may be associated with a curation functionality, and so forth).

In some implementations, role-based workbench component 305 may be associated with authentication and/or authorization of a user of the data intelligence platform. For example, role-based workbench component 305 may provide a user interface and/or may perform functionality related to login of the user, access by the user to components and/or functionality of the data intelligence platform, and/or the like. Continuing with the previous example, the data intelligence platform may utilize role-based workbench component 305 to request, receive, and/or verify a username/password combination, biometric information (e.g., a finger print scan, a voice scan, and/or the like), a security token, and/or the like.

As further shown in FIG. 3, the data intelligence platform may include a data intelligence component 310. For example, data intelligence component 310 may be configured to process data associated with an organization, such as to identify an issue related to the data. In some implementations, the data intelligence platform may process the data utilizing a set of microservices, a set of data feature models, a set of APIs, and/or the like associated with and/or accessible via data intelligence component 310. For example, data intelligence component 310 may implement the corpus API container described elsewhere herein.

In some implementations, data intelligence component 310 may include a discovery component. For example, the discovery component may be configured to perform data discovery related to the data. In some implementations, when performing data discovery, the discovery component may process data related to an organization to identify data sources of the data. For example, the discovery component may identify locations where the data is stored (e.g., identifiers of devices that store the data, whether the locations are on premises of the organization and/or are cloud-based based on metadata associated with the data, and/or the like), operations of the organization with which the data is associated, amounts of data associated with the organization, and/or the like. In some implementations, when performing data discovery, the discovery component may process data stored across hundreds, thousands, or more systems and/or devices associated with the organization. In this way, the discovery component may process a data set and/or may perform data discovery in a manner that cannot be performed objectively by a human actor.

As further shown in FIG. 3, the data intelligence platform may include a discovery component which includes various components related to performing data discovery. For example, the discovery component may include a data visualization component, which may generate visualizations of the data and/or of a virtual map of sources of the data (e.g., may generate a system map of systems, devices, and/or the like that store data, may generate a table that includes the data, and/or the like), and may provide the visualizations for display. Additionally, or alternatively, and as another example, the discovery component may include a data metrics dashboard component, which may determine metrics related to the data and/or may provide the metrics for display. Additionally, or alternatively, and as another example, the discovery component may include a metadata repository component, which may store metadata related to the data.

Additionally, or alternatively, and as another example, the discovery component may include a data lineage component, which may determine a data lineage of the data (e.g., information that identifies an origin of the data, systems that use the data, and/or the like) and may provide information related to the data lineage for display. Additionally, or alternatively, and as another example, the discovery component may include a data assessment component, which may determine types of data included in the data, a format of the data, a size of the data, and/or the like. Additionally, or alternatively, and as another example, the discovery component may include a risk management component, which may determine a likelihood that the data includes an issue (e.g., based on the type of the data, whether the data was manually generated in a system, and/or the like) and may utilize information identifying the likelihood when processing the data (e.g., a more rigorous process may be used to process the data when the likelihood satisfies a threshold).

Additionally, or alternatively, and as another example, the discovery component may include a data connector component, which may provide connectivity from the discovery component to the data management component, to a source of the data (or a data storage component associated with data intelligence platform), and/or the like. Additionally, or alternatively, and as another example, the discovery component may include a knowledge graph component, which may generate a knowledge graph of the data, such a knowledge graph that identifies common systems that use portions of the data, common storage locations of different portions of the data, and/or the like. In some implementations, this information may be used by the data intelligence platform to determine a fix for an issue identified in the data, to generate a recommendation for the data, and/or the like. Additionally, or alternatively, and as another example, the discovery component may include a roadmap component, which may generate a recommendation for improving a quality of the data based on an issue identified in the data.

Additionally, or alternatively, data intelligence component 310 may include a veracity component. For example, the veracity component may be configured to perform data veracity related to the data. In some implementations, when performing data veracity, the veracity component may process data associated with an organization to determine whether the data is properly formatted, to determine whether the data is accurate, and/or the like. For example, the veracity component may determine whether the values for the data are within a particular range, include proper alphanumeric values, and/or the like by utilizing a machine learning model to process thousands, millions, or more data elements from various sources of data. In this way, the veracity component may process a data set that cannot be processed manually by a human actor.

As further shown in FIG. 3, the veracity component may include various components related to performing data veracity. For example, the veracity component may include an anomaly detection component, which may detect an anomaly in the data that is indicative of the data including an issue. Additionally, or alternatively, and as another example, the veracity component may include a consistency component, which may determine a consistency of the data (e.g., whether formatting of the data is consistent, whether data elements and/or attributes included in the data are consistent, and/or the like). Additionally, or alternatively, and as another example, the veracity component may include a bias and ambiguity component, which may identify biases and/or ambiguities within the data (e.g., may determine that retail data is biased toward a particular age group or gender), and may use this information when identifying an issue, when determining a fix for the issue, when generating a recommendation for the data, and/or the like.

Additionally, or alternatively, and as another example, the veracity component may include an integrity component, which may determine a completeness of the data (e.g., whether data elements are missing from the data). Additionally, or alternatively, and as another example, the veracity component may include a uniqueness component, which may determine whether the data includes duplicative data elements. Additionally, or alternatively, and as another example, the veracity component may include a policies component, which may determine whether the data conforms to particular rules and/or policies associated with the organization (e.g., encryption rules and/or policies, file size limits, and/or the like). In some implementations, the policies component may utilize one or more of the corpuses described elsewhere herein to process the data. Additionally, or alternatively, and as another example, the veracity component may include a provenance component, which may determine manners in which the data has been manipulated after being generated (e.g., via use of metadata and/or logs that identify changes to the data).

Additionally, or alternatively, and as another example, the veracity component may include an accuracy component, which may determine an accuracy of data elements within the data (e.g., by determining whether values for the data are within a range of values, whether values for the data include a threshold quantity of decimal places, and/or the like). Additionally, or alternatively, and as another example, the veracity component may include a compliance component, which may determine whether the data has been generated according to particular practices (e.g., security practices, anonymization practices, and/or the like). In some implementations, the compliance component may utilize one or more of the corpuses described elsewhere herein to process the data. Additionally, or alternatively, and as another example, the veracity component may include a machine learning (ML) component, which may implement and/or utilize one or more of the machine learning models described elsewhere herein to process data.

Additionally, or alternatively, data intelligence component 310 may include a curation component. For example, the curation component may be configured to perform data curation related to the data. In some implementations, when performing data curation, the curation component may process the data to fix an issue related to the data (e.g., a formatting issue, an accuracy issue, and/or the like), may process the data to modify the data for a particular need of the organization (e.g., a first department of the organization may have generated the data, and a second department of the organization may need the data formatted in a different way than originally formatted when generated by the first department), and/or the like. In some implementations, the curation component may perform data curation on thousands, millions, or more data elements, such as by utilizing a machine learning model to process the data elements to perform the data curation. In this way, the curation component may process a data set that cannot be processed manually by a human actor.

In this way, the data intelligence platform is capable of identifying data associated with an organization (e.g., across thousands, millions, or more sources of data), determining a quality of the data (e.g., whether the data includes an issue, as the data moves throughout a data supply chain associated with the data, and/or the like), and/or processing the data to fix the data and/or place the data in a needed form. In this way, the data intelligence platform provides a tool that an organization can use to perform these actions in a manner not previously possible and/or not possible by a human actor.

As further shown in FIG. 3, the data intelligence platform may include a data management component 315. For example, data management component 315 may be configured to facilitate access to a corpus component 320 associated with the data intelligence platform and/or to a source of the data (e.g., a source of data associated with the organization and/or with the data intelligence platform). Continuing with the previous example, data management component 315 may provide data intelligence component 310 with connectivity to corpus component 320, to a source of the data (e.g., hundreds, thousands, or more sources of the data), and/or the like. In some implementations, data management component 315 may implement and/or communicate with a knowledge graph, an enterprise data storage, a BaaS platform, and/or the like similar to that described elsewhere herein.

In some implementations, data management component 315 may include a metadata management component. For example, the metadata management component may be configured to manage and/or process metadata related to data that the data intelligence platform is processing. In some implementations, the metadata management component may gather metadata related to the data, may provide access to the metadata (e.g., via the role-based workbench), may process the metadata utilizing the corpuses that the corpus component is storing, such as to identify an issue related to the metadata, and/or the like. In some implementations, the metadata management component may generate a visualization for the data (e.g., a chart, a graph, a table, and/or the like) and may provide the visualization for display via a display associated with the data intelligence platform and/or the client device.

Additionally, or alternatively, data management component 315 may include a data access component. For example, the data access component may be configured to manage access to data being processed by the data intelligence platform. In some implementations, the data access component may gather the data for analysis (e.g., from a source of data associated with an organization, from data storage associated with the data intelligence platform on behalf of a component of the data intelligence platform, and/or the like), may request authentication of a user of the data intelligence platform to permit access of the user of the data intelligence platform to the data (e.g., by causing a login user interface to be provided for display via a display associated with the data intelligence platform and/or the client device, by outputting a notification for display that requests input of authentication information associated with the user, and/or the like), and/or the like.

As further shown in FIG. 3, the data intelligence platform may include a corpus component 320. For example, the corpus component may store one or more corpuses described herein (e.g., one or more common corpuses, one or more industry corpuses, one or more organization corpuses, and/or the like). In some implementations, the one or more corpuses stored by corpus component 320 may be implemented as a graph structure (e.g., as a knowledge graph similar to that described elsewhere herein). For example, a corpus (e.g., a common corpus, an industry corpus, and/or an organization corpus) may be implemented as a graph data structure of nodes and/or edges that can be used to process the data in the manner described herein. This facilitates efficient management and/or use of the corpuses, thereby conserving processing resources related to use of the corpuses.

As further shown in FIG. 3, the various corpuses may include various features and/or information. For example, the common corpus may include a common data model, which may identify attributes and/or data elements that are expected to be included in the data, limitations on values for the data, and/or the like (e.g., that are common across industries and/or organizations). Additionally, or alternatively, and as another example, the common corpus may include a data dictionary, which may identify an expected formatting of the data, a structure of the data, a relationship between data from different sources of data, and/or the like.

Additionally, or alternatively, and as another example, the common corpus may include metrics and/or ranges information that identifies metrics and/or ranges for the data (e.g., metrics to be used to determine a quality of the data, ranges of expected values for the metrics, and/or the like). Additionally, or alternatively, and as another example, the common corpus may include questionnaire information that identifies a result of a questionnaire provided to individuals associated with an organization related to practices of the organization with regard to the data (e.g., actual practices versus expected practices), manners in which the data is used (e.g., actual uses versus expected uses), and/or the like. In some implementations, the information may be used by a machine learning model to determine whether the data includes an issue, to resolve discrepancies between a form of the data and an expected form of the data, and/or the like.

Additionally, or alternatively, and as another example, the common corpus may include a roadmap model, which may include a machine learning model that has been trained to provide recommendations related to fixing an issue in the data. Additionally, or alternatively, and as another example, the common corpus may include an algorithmic model, which may include a machine learning model to facilitate analysis of the data utilizing the common corpus.

As further shown in FIG. 3, the industry corpus may include various features and/or information. For example, the industry corpus may include an industry data model similar to the common data model described above. Additionally, or alternatively, and as another example, the industry corpus may include an industry data dictionary similar to the data dictionary described above with regard to the common corpus. Additionally, or alternatively, and as another example, the industry corpus may include bias and/or sensitivity information related to determining a bias and/or a sensitivity of the data (e.g., related to determining whether the data is skewed in a particular manner, determining a confidence of an accuracy associated with the data, and/or the like). Additionally, or alternatively, and as another example, the industry corpus may include information related to metrics to be used to analyze the data (e.g., key performance indicators (KPIs), benchmarks, and/or the like).

Additionally, or alternatively, and as another example, the industry corpus may include information that identifies expected data patterns in the data. Additionally, or alternatively, and as another example, the industry corpus may include rules and root causes information to be used to determine whether the data satisfies a set of industry-related rules, to identify root causes of issues in the data from an industry perspective, and/or the like. Additionally, or alternatively, and as another example, the industry corpus may include process information to be used to analyze the data related to a particular industry-related process. Additionally, or alternatively, and as another example, the industry corpus may include industry features information that identifies features of an industry that are to be used to process the data (e.g., a machine learning model may be trained on the industry features, and may determine whether the data is in a form that matches the industry features).

As further shown in FIG. 3, the organization corpus may include organization features information that identifies organization features of an organization that are to be used to process the data (e.g., a machine learning model may be trained on the organization features, and may determine whether the data is in a form that matches the organization features).

As further shown in FIG. 3, the data intelligence platform may include a data storage component 325. For example, the data intelligence platform may use data storage component 325 to store data to be analyzed (e.g., may implement the enterprise data storage, may store a copy of data stored in the enterprise data storage that is to be analyzed, and/or the like), may store a result of analyzing the data, may store fixed data to be provided to the organization (e.g., to be used to replace data stored in the enterprise data storage), and/or the like. In some implementations, the data intelligence platform may use data storage component 325 to copy data from the organization for analysis prior to analyzing and/or fixing the data. This reduces or eliminates a risk of the data intelligence platform inadvertently introducing errors to the data that the organization is actively using, reduces or eliminates a risk of overloading computing resources associated with the organization during analysis of the data and/or fixing of the data, reduces or eliminates a risk of interruptions to operations of the organization due to the data intelligence platform performing the analysis of the data and/or fixing of the data, and/or the like.

As further shown in FIG. 3, the data intelligence platform may utilize and/or implement a set of common services 330 for one or more components of the data intelligence platform. For example, the data intelligence platform may utilize the set of common services 330 to control access to the one or more components and/or the data intelligence platform, to control and/or supplement functioning of the one or more components and/or of the data intelligence platform, to provide a service to the one or more components and/or to the data intelligence platform, and/or the like.

In some implementations, the set of common services 330 may include a security service (e.g., authentication, intrusion detection, and/or the like), a caching service (e.g., to queue requests for use of the one or more components and/or of the data intelligence platform, to store results of analyses that the data intelligence platform and/or the one or more components perform, and/or the like), a logging service (e.g., to log use of the data intelligence platform and/or the one or more components, to log crashes or other issues related to the data intelligence platform and/or the one or more components, and/or the like), an auditing service (e.g., to assess functioning of the data intelligence platform and/or the one or more components, to assess access to and/or use of the data intelligence platform and/or the one or more components, and/or the like), and/or the like. In some implementations, the data intelligence platform may utilize the set of common services 330 during operation of the data intelligence platform, based on input to the data intelligence platform from a user of the data intelligence platform, and/or the like.

In some implementations, the set of common services 330 may be centralized to the data intelligence platform. For example, the data intelligence platform may implement the set of common services 330 such that any of the components can access the set of common services. As a specific example with regard to the logging service, the data intelligence platform may implement a centralized logging service to log errors and/or events from the components of the data intelligence platform in a central repository. This reduces or eliminates a need for duplicative implementation of services (which conserves memory resources of the data intelligence platform), facilitates sharing of information among components of the data intelligence platform, and/or the like.

As further shown in FIG. 3, the data intelligence platform may include a cloud deployment and management services 335. For example, the cloud deployment and management system 335 may include one or more devices and/or components configured to perform various actions related to a cloud deployment of the data intelligence platform. For example, the cloud deployment and management system 335 may perform a set of actions related to deploying the data intelligence platform in a cloud-based environment (e.g., may perform install and/or uninstall actions on various cloud-based computing devices, may identify cloud-based computing devices on which the data intelligence platform is to be deployed or is deployed, and/or the like), may perform a set of actions related to managing a cloud-based deployment of the data intelligence platform (e.g., may monitor operation of the data intelligence platform by gathering various metrics, may perform failover services for the data intelligence platform in an event of a data center outage, and/or the like), and/or the like.

In some implementations, the cloud deployment and management system 335 may provide information related to a cloud-based deployment of the data intelligence platform for display via a display associated with the data intelligence platform and/or the client device. For example, the data intelligence platform may provide metrics related to operation of a cloud-based deployment of the data intelligence platform for display, information that identifies a location of computing resources on which the data intelligence platform is deployed, information that identifies an occurrence of a data center outage (or other issue related to the cloud-based deployment) for display and any corrective actions that the data intelligence platform performed, and/or the like.

In some implementations, when processing data associated with an organization in the manner described herein, the data intelligence platform may utilize a set of microservices (e.g., the discovery component may utilize a first set of microservices to perform data discovery, the veracity component may utilize a second set of microservices to perform data veracity, the curation component may utilize a third set of microservices to perform data curation, and/or the like). For example, the data intelligence platform may utilize the set of microservices to process the data to identify an issue related to the data, to fix the data, and/or the like. As specific examples, the data intelligence platform may utilize the set of microservices to identify the data across multiple sources of data associated with the organization (e.g., multiple systems and/or devices) and/or to identify a structure of the data (e.g., a format of the data, attributes and/or data elements included in the data, and/or the like). Continuing with the previous specific examples, the data intelligence platform may utilize the set of microservices to detect an anomaly in the data that is indicative of the data including an issue, to fix the issue, and/or the like.

In this way, different functionalities of the data intelligence platform may be independently modeled and/or deployed as different microservices. This facilitates introduction of new functionality, customization of existing functionality, and/or the like in an agile, flexible, and/or modularized manner, which may reduce or eliminate downtime of the data intelligence platform, may reduce or eliminate interruptions to operations of the data intelligence platform during introduction and/or modification of functionality of the data intelligence platform, and/or the like.

In some implementations, the set of microservices may be deployed via a set of containers. For example, the data intelligence platform may utilize a set of containers to implement functionality of one or more of the components of the data intelligence platform (e.g., functionality associated with the set of microservices). In some implementations, the set of containers may be modularized (e.g., may be separately deployed from each other). This facilitates quick, easy, and customizable deployment of the data intelligence platform to different on-premises and/or cloud environments, thereby facilitating portability of the data intelligence platform. In addition, this facilitates process-level isolation of functionality and/or components of the data intelligence platform.

As indicated above, FIG. 3 is provided merely as an example. Other examples may differ from what was described with regard to FIG. 3.

FIGS. 4A-4E are diagrams of one or more example implementations 400 described herein.

Figure 4A:
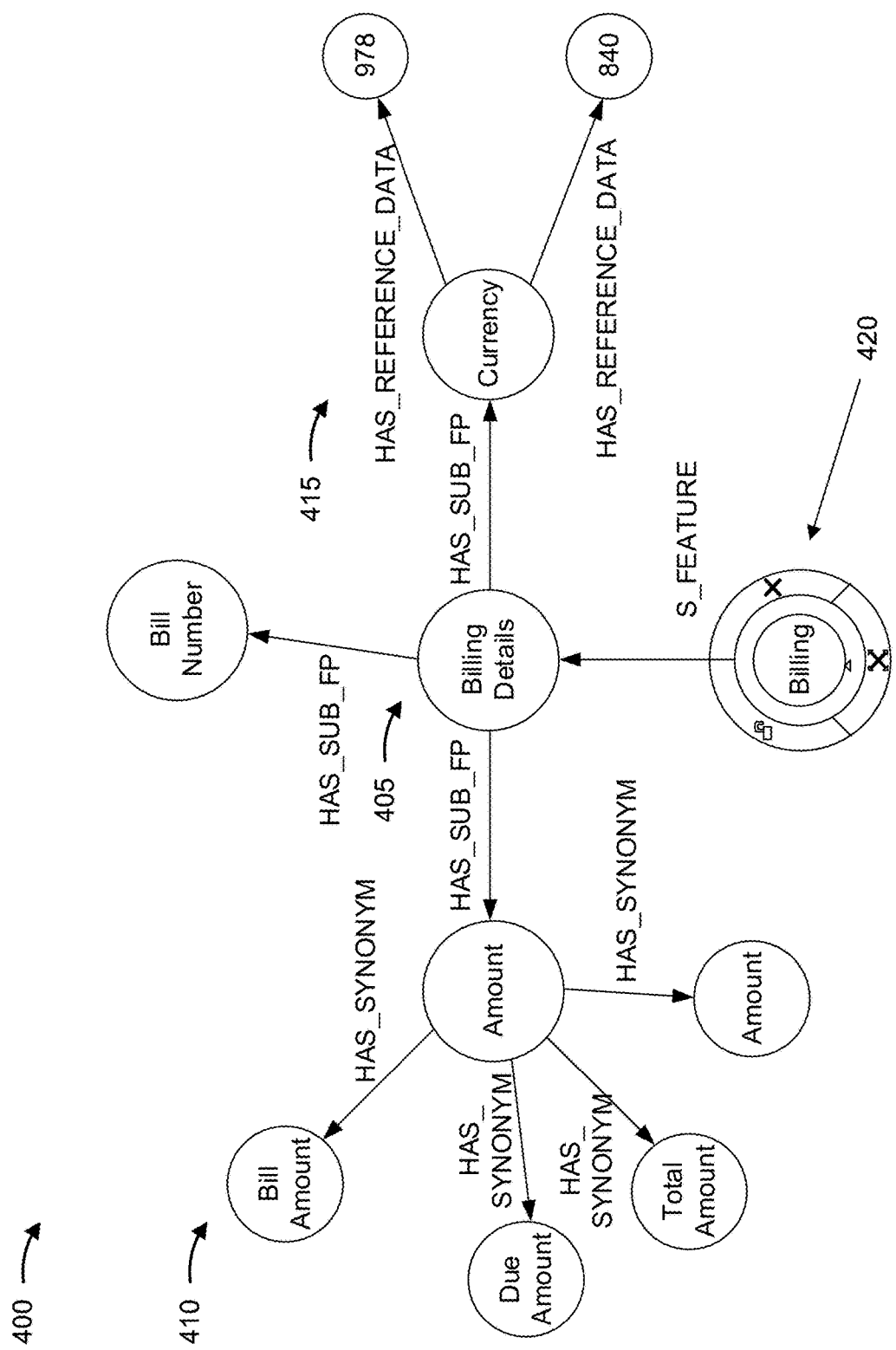

FIG. 4A shows an example implementation related to a data feature model. As shown in FIG. 4A, a data feature model may include a set of nodes stored in a knowledge graph. For example, the set of nodes may be associated with a particular data element, an attribute of the data element, and/or the like. As shown by reference number 405, a data feature model may include information that identifies a data element with which the data feature model is associated. For example, the data feature model may include information that identifies a billing details data element as a node of the data feature model. As shown by reference numbers 410 and 415, the data feature model may include additional nodes that identify a set of attributes of the data element. For example, the data feature model may include nodes that identify an amount attribute, a currency attribute, a bill number attribute, and/or the like as attributes of a billing details data element.

In some implementations, and as further shown in FIG. 4A, a data feature model may include nodes that identify semantic, formatting, data type, and/or the like variations and/or patterns for attributes associated with a data element. For example, and for a billing details data element, an amount attribute may be identified by different attribute identifiers in different data sets, such as "bill amount," "due amount," "total amount," and/or "amount." In some implementations, and as described elsewhere herein, the data intelligence platform may use a data feature model configured in a similar manner to discover data associated with an organization. For example, the data intelligence platform may use a data feature model similar to that shown in FIG. 4A to perform data discovery of billing details type data based on attributes identified by the data feature model (e.g., by matching nodes of the data feature model with attributes included in a data set).

In some implementations, a visualization of the data feature model shown in FIG. 4A may be provided for display via a display associated with the data intelligence platform. As shown by reference number 420, the visualization may include a user interface element with which a user of the data intelligence platform can interact to modify the data feature model (e.g., to modify nodes included in the data feature model, to add nodes to and/or delete nodes from the data feature model, to generate a new data feature model, and/or the like).

Figure 4B:
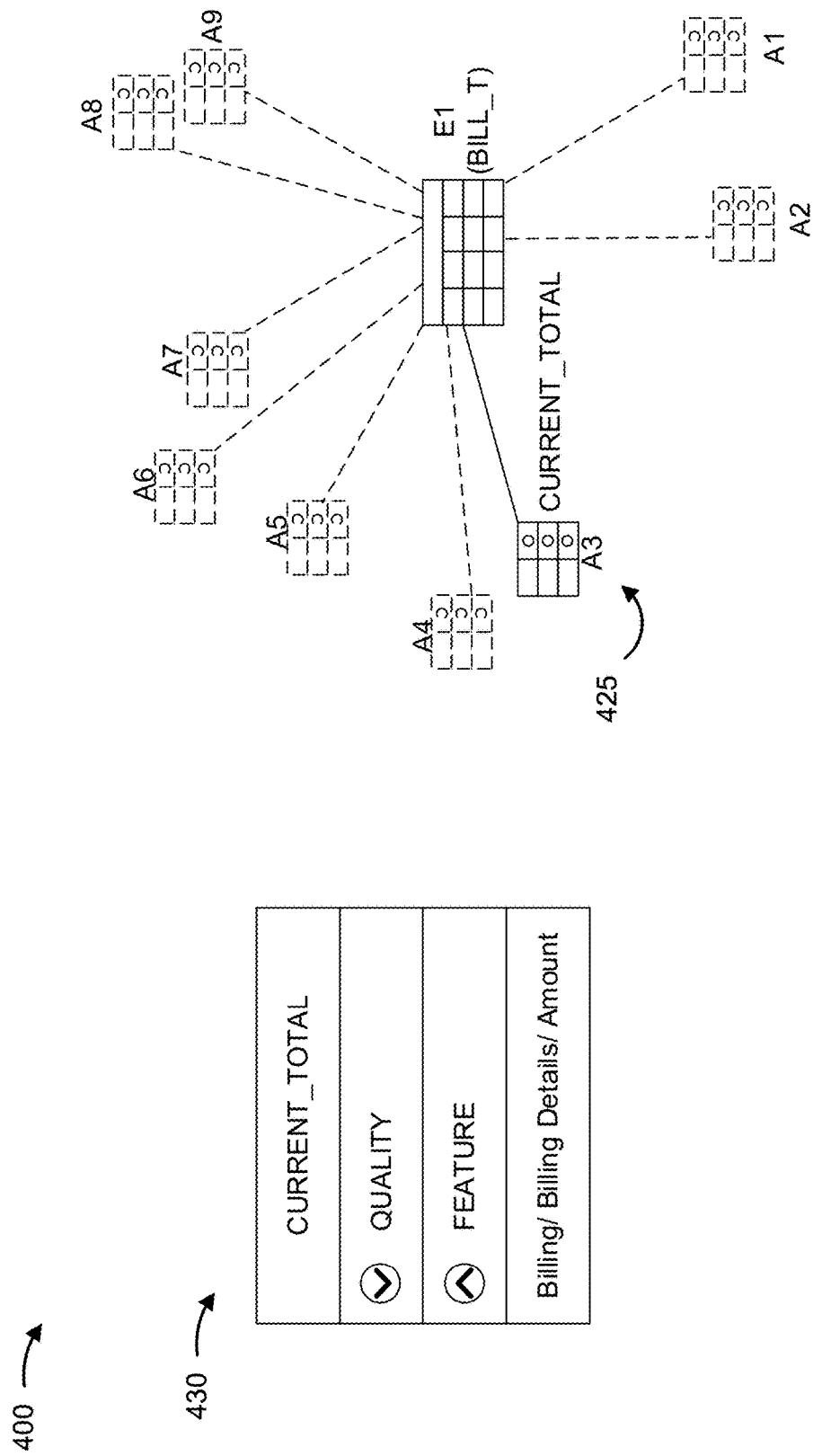

FIG. 4B shows an example of a visualization of a result of using a data feature model to process data associated with an organization in a manner similar to that described herein. As shown by reference number 425, performing data discovery using the data feature model shown in FIG. 4B may have resulted in a match between a node that identifies a data element (e.g., shown as E1) and another node that identifies an attribute (e.g., shown as A3), and the visualization of the result may identify this match by including a solid line to show the data element-attribute match. As shown by reference number 430, the visualization may include information that identifies various metrics related to processing the data and/or may include various user interface elements that can be used to filter and/or provide various views of the information.

Figure 4C:
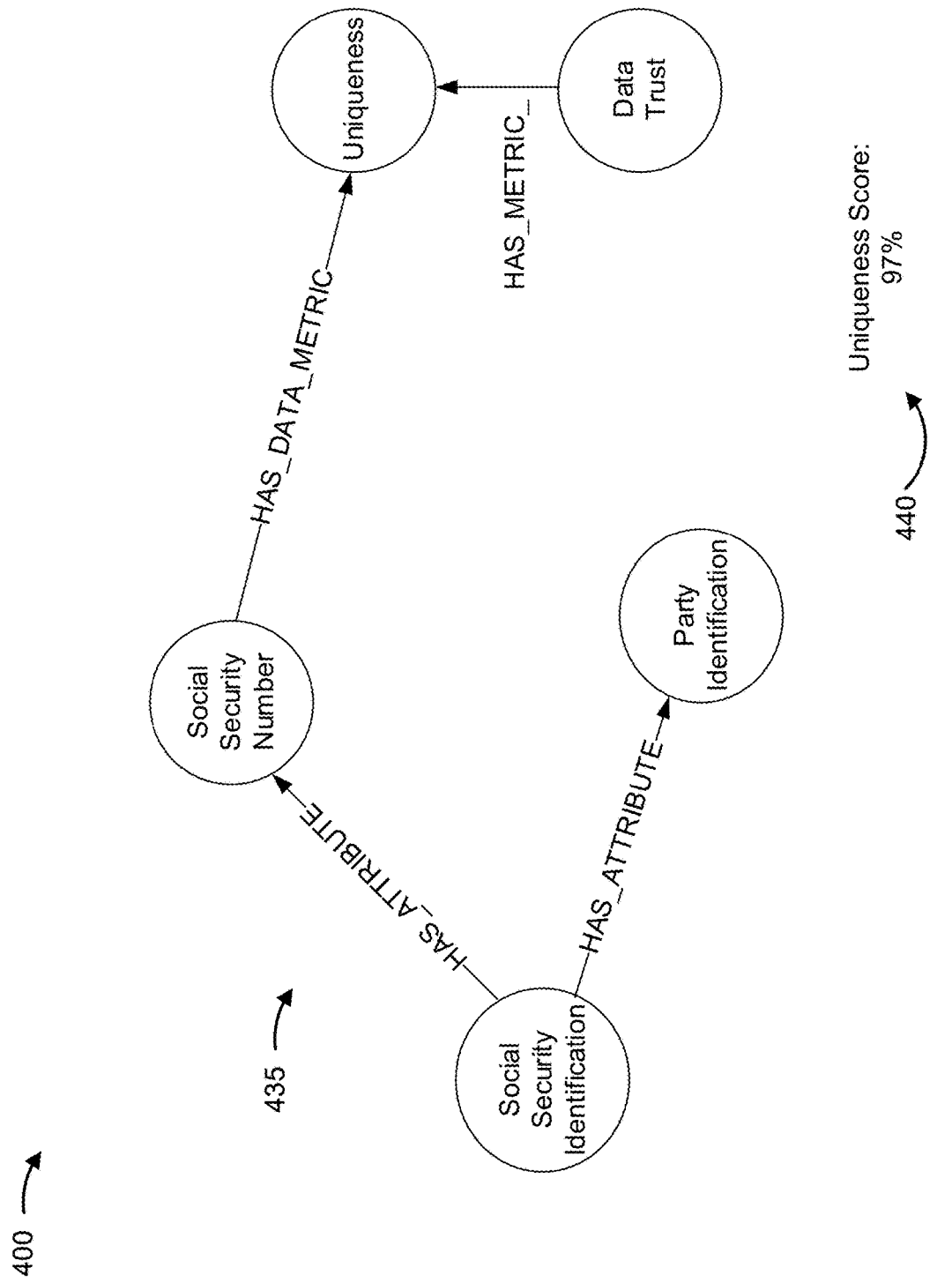

FIG. 4C is a visualization of a set of metrics that attributes of data may have. For example, and as shown by reference number 435, the visualization may identify various nodes of a data feature model and may include additional nodes related to metrics that can be used to evaluate data (e.g., shown as "Uniqueness" and "Data Trust"). For example, and as shown in FIG. 4C, the visualization may include a node that identifies a score for a uniqueness of the data, a score for data trust of the data based on the uniqueness of the data and/or one or more other metrics, and/or the like. The score can be a measured score for data, can identify an industry or organization benchmark, and/or the like. As shown by reference number 440, the visualization may include information that identifies one or more of the scores associated with attributes of the data feature model. For example, the visualization may include information that identifies the uniqueness score determined for a data set (e.g., a score that identifies a percentage of data elements or records included in the data set that are unique), an industry or organization benchmark score, and/or the like.

Figure 4D:
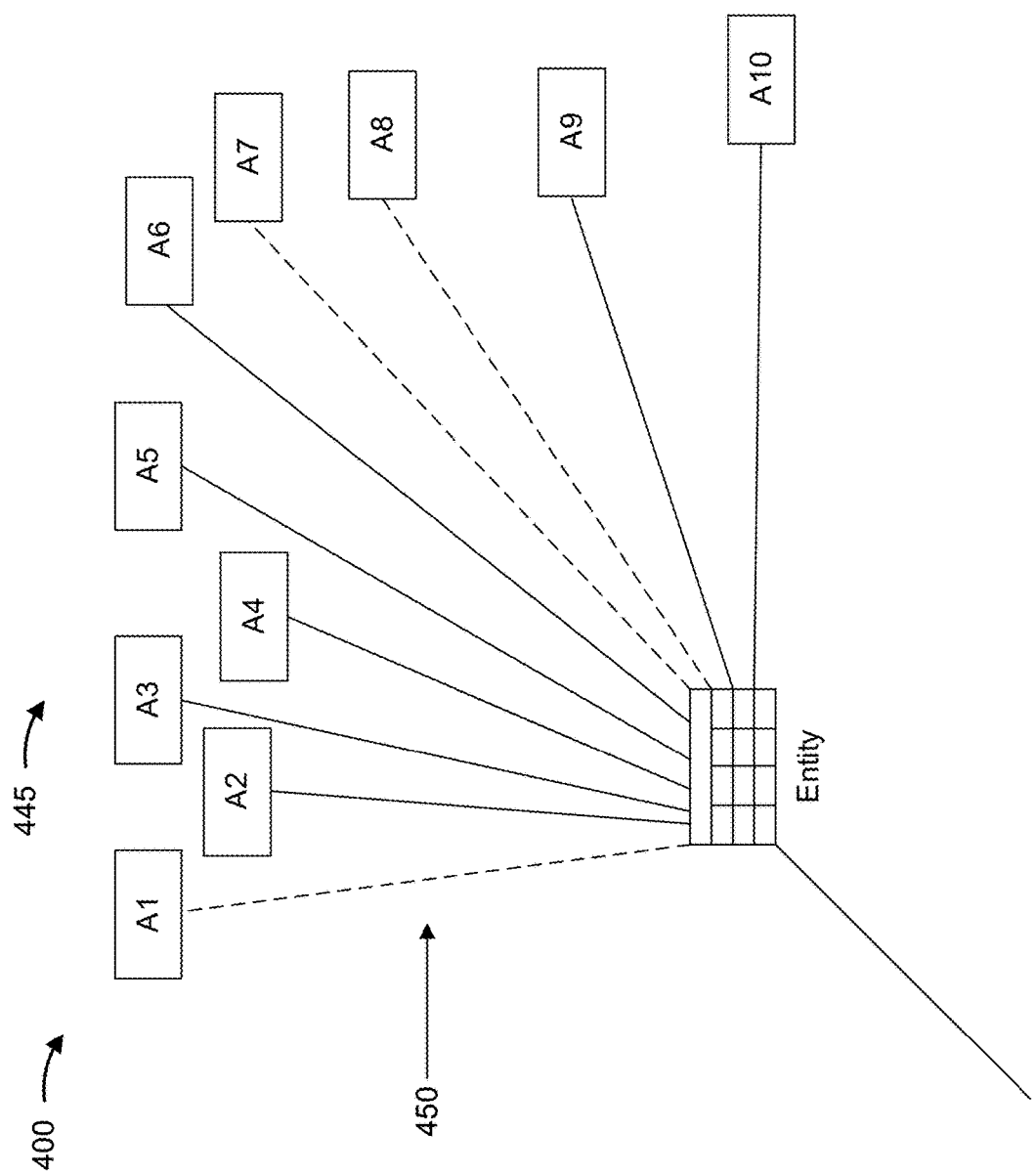

FIG. 4D shows an example node structure for a data feature model. As shown by reference number 445, the data feature model may include an entity node (e.g., shown as "Entity") and various attribute nodes (e.g., shown as attributes "A1" through "A10"). As shown by reference number 450, when the data intelligence platform uses the data feature model to perform data discovery, output from the data feature model may indicate attributes that match between the data feature model and data that the data intelligence platform is processing. For example, and as shown in FIG. 4D, an attribute that matches may be associated with a solid line between the attribute node for the attribute and the entity node, and an attribute that does not match may be associated with a dotted line.

In some implementations, the data intelligence platform may provide a visualization of the data feature model and/or a result of using the data feature model (e.g., a visualization of the data feature model with solid and dotted lines described above). This may provide a user of the data intelligence platform with a quick and easy visualization of a result of using the data feature model to process data. In some implementations, the data intelligence platform may process a result of using the data feature model to identify types of data included in the data, to determine a score for the data, and/or the like in a manner similar to that described elsewhere herein. For example, the data intelligence platform may process the result using a machine learning model.

FIG. 4E shows a result of the data intelligence platform using various data feature models to process data in a manner that is the same as or similar to that described elsewhere herein. For example, the solid lines shown in FIG. 4E may identify entity-attribute pairs that match the data that the data intelligence platform processed. Reference number 455 shows a particular entity-attribute pair that matches the data that was processed (e.g., an entity-attribute pair of entity E1 and attribute A1). As shown by reference number 460, the entity-attribute pair of entity E1 and attribute A1 may be associated with a set of scores and/or metrics. In some implementations, the data intelligence platform may provide the result of using the various data feature models for display (e.g., where the entity nodes and/or the attribute nodes of the various data feature models are user interface elements of a visualization of the various data feature models). In some implementations, user interaction with information provided for display may cause the data intelligence platform to provide a set of user interface elements that includes information identifying the set of scores and/or metrics for display.

As indicated above, FIGS. 4A-4E are provided merely as an example. Other examples may differ from what was described with regard to FIGS. 4A-4E.

Figure 5:
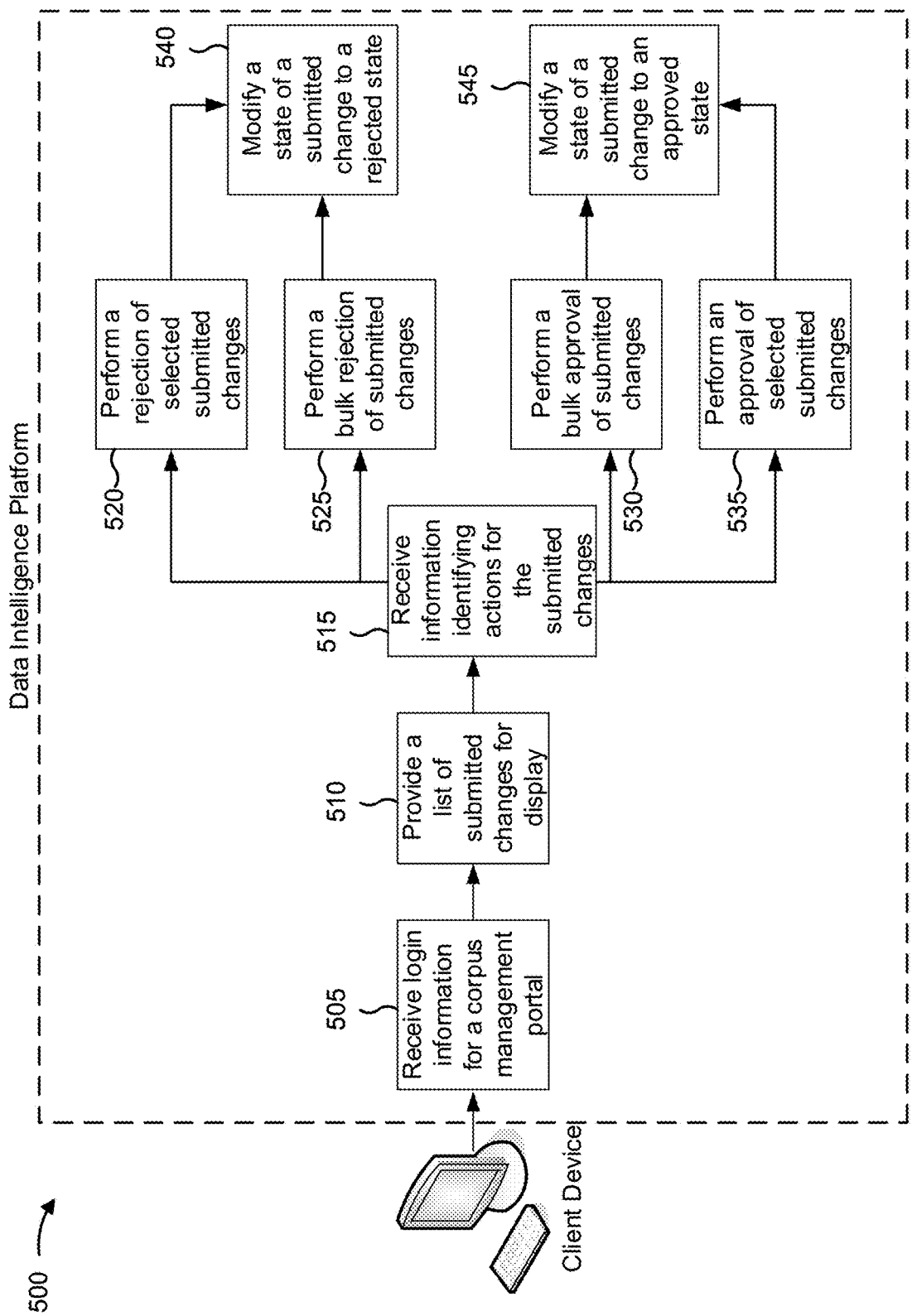

FIG. 5 is a diagram of an example implementation 500 described herein. FIG. 5 shows an example process for approving and/or rejecting updates to a corpus via a data intelligence platform.

As shown by reference number 505, a data intelligence platform may receive login information for a corpus management portal. For example, the data intelligence platform may receive the login information when a user of a client device provides a set of credentials (e.g., a username/password combination, biometric information, and/or the like) to the data intelligence platform for authentication. In some implementations, the corpus management portal may be implemented by a component of the data intelligence platform and may provide a set of UIs and/or functionality that can be used to approve and/or reject updates to a corpus.

As shown by reference number 510, the data intelligence platform may provide a list of submitted changes for display. For example, the data intelligence platform, utilizing the corpus management portal, may provide a list of submitted changes to modify a corpus for display via a set of UIs. As shown by reference number 515, the data intelligence platform may receive information identifying actions for the submitted changes. For example, the user of the client device may interact with a user interface to identify actions to be performed with respect to the submitted changes (e.g., approval of a submitted change, rejection of a submitted change, and/or the like) and the data intelligence platform may receive information that identifies the actions that the user selected for the submitted changes. Continuing with the previous example, the user may select some submitted changes to be approved, some submitted changes to be rejected, and/or the like.

As shown by reference number 520, the data intelligence platform may perform a rejection of selected submitted changes. For example, the data intelligence platform may receive information that identifies a set of submitted changes that is to be rejected, and the data intelligence platform may perform a rejection of the set of submitted changes. As shown by reference number 525, the data intelligence platform may perform a bulk rejection of submitted changes. For example, the data intelligence platform may receive information that identifies that all submitted changes are to be rejected, and the data intelligence platform may perform a rejection of all submitted changes at the same time.

As shown by reference number 530, the data intelligence platform may perform a bulk approval of submitted changes. For example, the data intelligence platform may receive information that identifies that all submitted changes are to be approved, and the data intelligence platform may perform an approval of all submitted changes at the same time. As shown by reference number 535, the data intelligence platform may perform an approval of selected submitted changes. For example, the data intelligence platform may receive information that identifies a set of submitted changes that is to be approved, and the data intelligence platform may perform an approval of the set of submitted changes.

As shown by reference number 540, the data intelligence platform may modify a state of a submitted change to a rejected state. For example, the data intelligence platform may modify a state of a submitted change to a rejected state based on performing a rejection of selected submitted changes, performing a bulk rejection of submitted changes, and/or the like. In some implementations, the data intelligence platform may update information in a data structure to modify the state to the rejected state. As shown by reference number 545, the data intelligence platform may modify a state of a submitted change to an approved state. For example, the data intelligence platform may modify a state of a submitted change to an approved state based on performing an approval of selected submitted changes, performing a bulk approval of submitted changes, and/or the like. In some implementations, the data intelligence platform may update information in a data structure to modify the state to the approved state. In some implementations, the data intelligence platform may modify a corpus based on an approved change (e.g., may add, remove, and/or modify information associated with the corpus).

As indicated above, FIG. 5 is provided merely as an example. Other examples may differ from what was described with regard to FIG. 5. Although FIG. 5 shows example blocks of a process for approving and/or rejecting updates to a corpus via a data intelligence platform, in some implementations, the process may include additional blocks, fewer blocks, different blocks, or differently arranged blocks than those depicted in FIG. 5. Additionally, or alternatively, two or more of the blocks of the process depicted in FIG. 5 may be performed in parallel.

Figure 6:
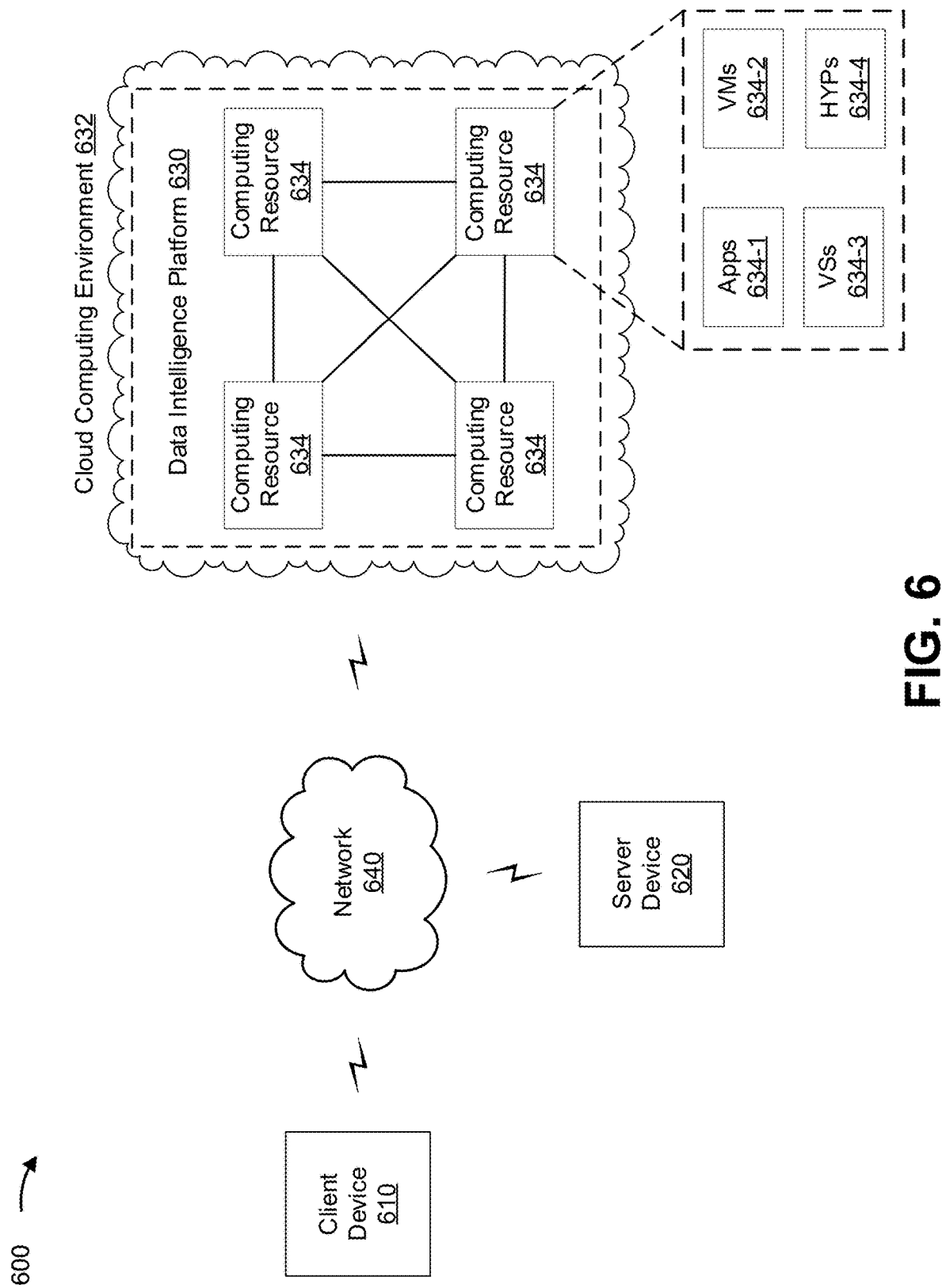
FIG. 6 is a diagram of an example environment in which systems and/or methods, described herein, may be implemented.

FIG. 6 is a diagram of an example environment 600 in which systems and/or methods, described herein, may be implemented. As shown in FIG. 6, environment 600 may include a client device 610, a server device 620, a data intelligence platform 630 hosted within a cloud computing environment 632 that includes a set of computing resources 634, and a network 640. Devices of environment 600 may interconnect via wired connections, wireless connections, or a combination of wired and wireless connections.

Client device 610 includes one or more devices capable of receiving, generating, storing, processing, and/or providing data associated with an organization. For example, client device 610 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 610 may provide, to data intelligence platform 630, information related to causing data intelligence platform 630 to process data associated with an organization, as described elsewhere herein.

Server device 620 includes one or more devices capable of receiving, generating storing, processing, and/or providing data associated with an organization. For example, server device 620 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 620 may include a communication interface that allows server device 620 to receive information from and/or transmit information to other devices in environment 600. In some implementations, server device 620 may be a physical device implemented within a housing, such as a chassis. In some implementations, server device 620 may be a virtual device implemented by one or more computer devices of a cloud computing environment or a data center. In some implementations, server device 620 may provide, to data intelligence platform 630, data to be processed by data intelligence platform 630, as described elsewhere herein.

Data intelligence platform 630 includes one or more devices capable of receiving, generating, storing, processing, and/or providing data associated with an organization. For example, data intelligence platform 630 may include a cloud server or a group of cloud servers. In some implementations, data intelligence platform 630 may be designed to be modular such that certain software components can be swapped in or out depending on a particular need. As such, data intelligence platform 630 may be easily and/or quickly reconfigured for different uses.

In some implementations, as shown in FIG. 6, data intelligence platform 630 may be hosted in cloud computing environment 632. Notably, while implementations described herein describe data intelligence platform 630 as being hosted in cloud computing environment 632, in some implementations, data intelligence platform 630 may not be cloud-based (i.e., may be implemented outside of a cloud computing environment) or may be partially cloud-based.

Cloud computing environment 632 includes an environment that hosts data intelligence platform 630. Cloud computing environment 632 may provide computation, software, data access, storage, and/or other services that do not require end-user knowledge of a physical location and configuration of a system and/or a device that hosts data intelligence platform 630. As shown, cloud computing environment 632 may include a group of computing resources 634 (referred to collectively as "computing resources 634" and individually as "computing resource 634").

Computing resource 634 includes one or more personal computers, workstation computers, server devices, or another type of computation and/or communication device. In some implementations, computing resource 634 may host data intelligence platform 630. The cloud resources may include compute instances executing in computing resource 634, storage devices provided in computing resource 634, data transfer devices provided by computing resource 634, etc. In some implementations, computing resource 634 may communicate with other computing resources 634 via wired connections, wireless connections, or a combination of wired and wireless connections.

As further shown in FIG. 6, computing resource 634 may include a group of cloud resources, such as one or more applications ("APPs") 634-1, one or more virtual machines ("VMs") 634-2, one or more virtualized storages ("VSs") 634-3, or one or more hypervisors ("HYPs") 634-4.

Application 634-1 includes one or more software applications that may be provided to or accessed by one or more devices of environment 600. Application 634-1 may eliminate a need to install and execute the software applications on devices of environment 600. For example, application 634-1 may include software associated with data intelligence platform 630 and/or any other software capable of being provided via cloud computing environment 632. In some implementations, one application 634-1 may send/receive information to/from one or more other applications 634-1, via virtual machine 634-2. In some implementations, application 634-1 may include a software application associated with one or more databases and/or operating systems. For example, application 634-1 may include an enterprise application, a functional application, an analytics application, and/or the like.

Virtual machine 634-2 includes a software implementation of a machine (e.g., a computer) that executes programs like a physical machine. Virtual machine 634-2 may be either a system virtual machine or a process virtual machine, depending upon use and degree of correspondence to any real machine by virtual machine 634-2. A system virtual machine may provide a complete system platform that supports execution of a complete operating system ("OS"). A process virtual machine may execute a single program, and may support a single process. In some implementations, virtual machine 634-2 may execute on behalf of a user (e.g., a user of client device 610), and may manage infrastructure of cloud computing environment 632, such as data management, synchronization, or long-duration data transfers.

Virtualized storage 634-3 includes one or more storage systems and/or one or more devices that use virtualization techniques within the storage systems or devices of computing resource 634. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 634-4 provides hardware virtualization techniques that allow multiple operating systems (e.g., "guest operating systems") to execute concurrently on a host computer, such as computing resource 634. Hypervisor 634-4 may present a virtual operating platform to the guest operating systems, and may manage the execution of the guest operating systems. Multiple instances of a variety of operating systems may share virtualized hardware resources.

Network 640 includes one or more wired and/or wireless networks. For example, network 640 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

Figure 7:
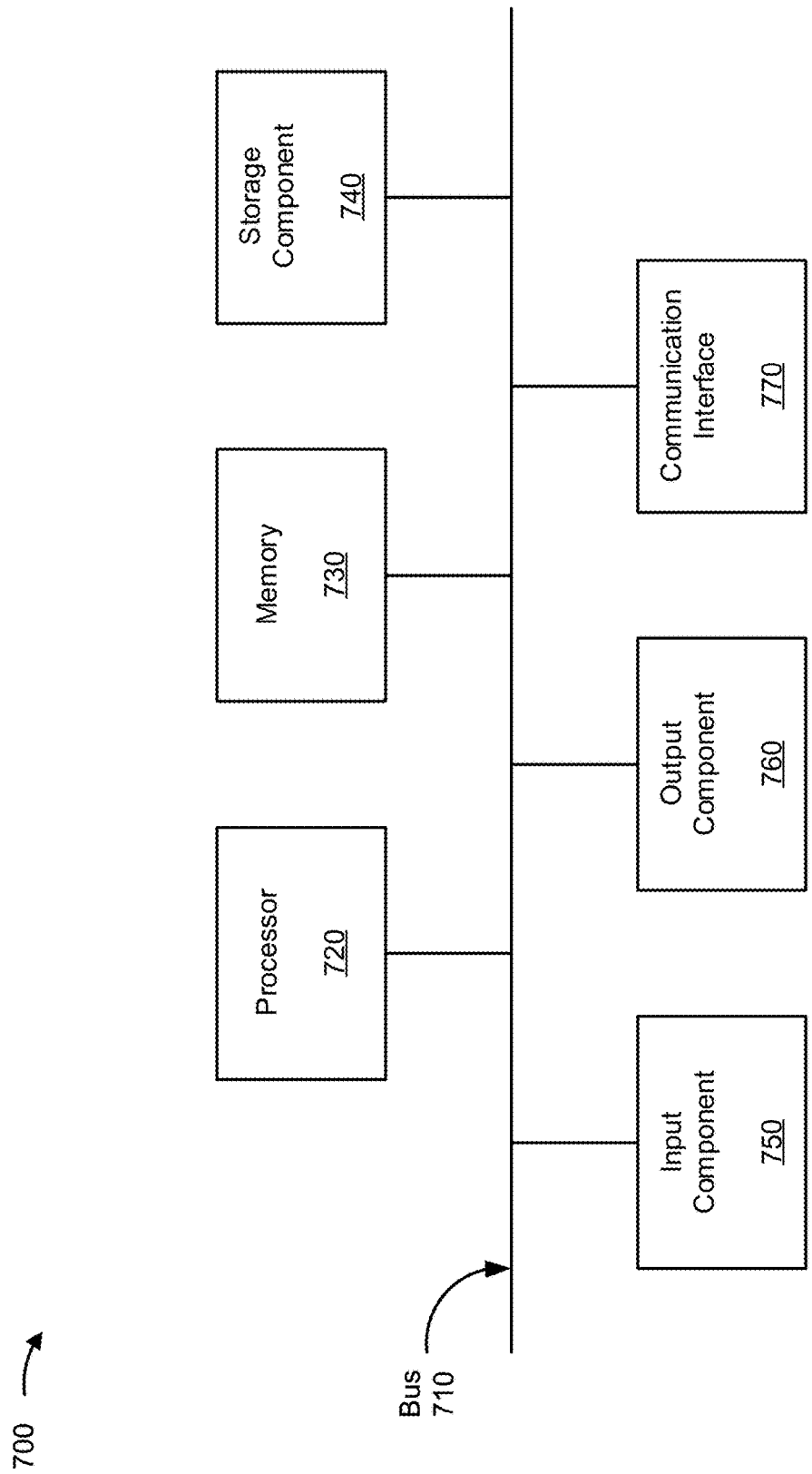
FIG. 7 is a diagram of example components of one or more devices of FIG. 6.

FIG. 7 is a diagram of example components of a device 700. Device 700 may correspond to client device 610, server device 620, data intelligence platform 630, and/or computing resource 634. In some implementations, client device 610, server device 620, data intelligence platform 630, and/or computing resource 634 may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes based on to processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
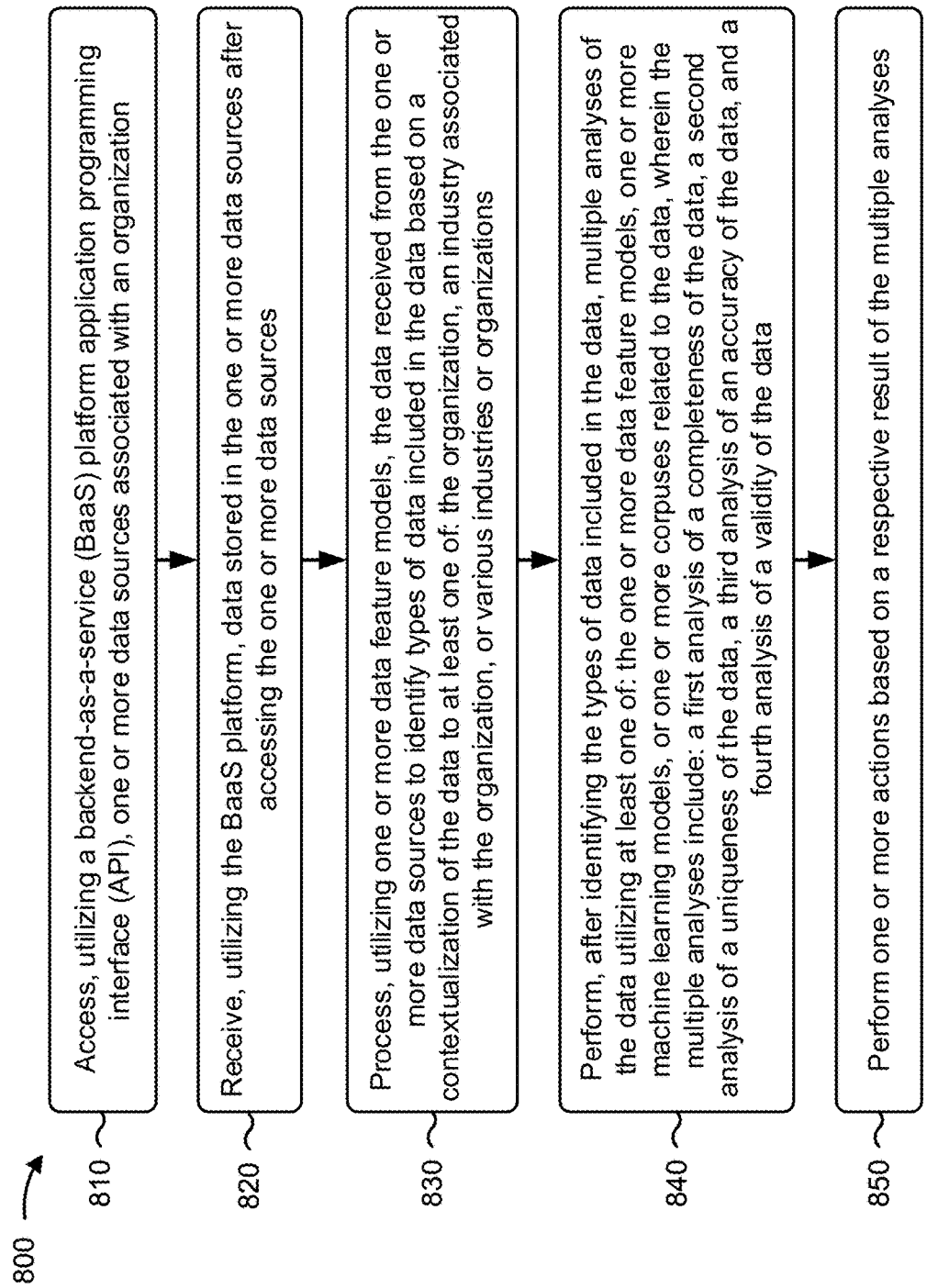
FIGS. 8-10 are flow charts of example processes for processing data utilizing a corpus.

FIG. 8 is a flow chart of an example process 800 for processing data utilizing a corpus. In some implementations, one or more process blocks of FIG. 8 may be performed by a data intelligence platform (e.g., data intelligence platform 630). In some implementations, one or more process blocks of FIG. 8 may be performed by another device or a group of devices separate from or including the data intelligence platform, such as a client device (e.g., client device 610), a server device (e.g., server device 620), or a computing resource (e.g., computing resource 634), and/or the like.

As shown in FIG. 8, process 800 may include accessing, utilizing a backend-as-a-service (BaaS) platform application programming interface (API), one or more data sources associated with an organization (block 810). For example, the data intelligence platform (e.g., using computing resource 634, processor 720, communication interface 770, and/or the like) may access, utilizing a backend-as-a-service (BaaS) platform application programming interface (API), one or more data sources associated with an organization, as described elsewhere herein.

As further shown in FIG. 8, process 800 may include receiving, utilizing the BaaS platform, data stored in the one or more data sources after accessing the one or more data sources (block 820). For example, the data intelligence platform (e.g., using computing resource 634, processor 720, memory 730, storage component 740, communication interface 770, and/or the like) may receive, utilizing the BaaS platform, data stored in the one or more data sources after accessing the one or more data sources, as described elsewhere herein.

As further shown in FIG. 8, process 800 may include processing, utilizing one or more data feature models, the data received from the one or more data sources to identify types of data included in the data based on a contextualization of the data to at least one of: the organization, an industry associated with the organization, or various industries or organizations (block 830). For example, the data intelligence platform (e.g., using computing resource 634, processor 720, and/or the like) may process, utilizing one or more data feature models, the data received from the one or more data sources to identify types of data included in the data based on a contextualization of the data to at least one of: the organization, an industry associated with the organization, or various industries or organizations, as described elsewhere herein.

As further shown in FIG. 8, process 800 may include performing, after identifying the types of data included in the data, multiple analyses of the data utilizing at least one of: the one or more data feature models, one or more machine learning models, or one or more corpuses related to the data, wherein the multiple analyses include: a first analysis of a completeness of the data, a second analysis of a uniqueness of the data, a third analysis of an accuracy of the data, and a fourth analysis of a validity of the data (block 840). For example, the data intelligence platform (e.g., using computing resource 634, processor 720, and/or the like) may perform, after identifying the types of data included in the data, multiple analyses of the data utilizing at least one of: the one or more data feature models, one or more machine learning models, or one or more corpuses related to the data, as described elsewhere herein. In some implementations, the multiple analyses include: a first analysis of a completeness of the data, a second analysis of a uniqueness of the data, a third analysis of an accuracy of the data, and a fourth analysis of a validity of the data.

As further shown in FIG. 8, process 800 may include performing one or more actions based on a respective result of the multiple analyses (block 850). For example, the data intelligence platform (e.g., using computing resource 634, processor 720, memory 730, storage component 740, output component 760, communication interface 770, and/or the like) may perform one or more actions based on a respective result of the multiple analyses, as described elsewhere herein.

Process 800 may include additional implementations, such as any single implementation or any combination of implementations described below and/or in connection with one or more other processes described elsewhere herein.

In some implementations, the one or more data feature models identify a respective set of attributes expected to be included in the types of data included in the data based on the contextualization of the data to the at least one of the organization, the industry, or the various industries or organizations. In some implementations, the one or more corpuses include at least one of: a common corpus related to the various industries or organizations, an industry corpus related to the industry associated with the organization, or an organization corpus related to the organization.

In some implementations, the one or more corpuses are stored in a knowledge graph associated with the device. In some implementations, the data intelligence platform may select, based on the contextualization, the one or more data feature models to use to process the data; may process, after selecting the one or more data feature models, the data by performing a comparison of first data features of the data and second data features included in the one or more data feature models; and may identify the types of data included in the data based on a result of the comparison of the first data features and the second data features.

In some implementations, the data intelligence platform may select a questionnaire, from a set of questionnaires stored in a data source associated with the device, to be provided to an individual associated with the organization, wherein the questionnaire is based on the contextualization of the data; may process, utilizing a natural language processing technique, a respective response to one or more questions associated with the questionnaire after selecting the questionnaire, wherein the respective response includes at least one of: text input to a user interface, selection of a user interface element of the user interface, or audio input to an input component associated with the device; and may perform the multiple analyses after processing the respective response utilizing the natural language processing technique. In some implementations, the data intelligence platform may determine separate scores for the first analysis, the second analysis, the third analysis, and the fourth analysis after performing the multiple analyses, wherein the separate scores identify the completeness, the uniqueness, the accuracy, and the validity of the data, and may perform the one or more actions based on the separate scores.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
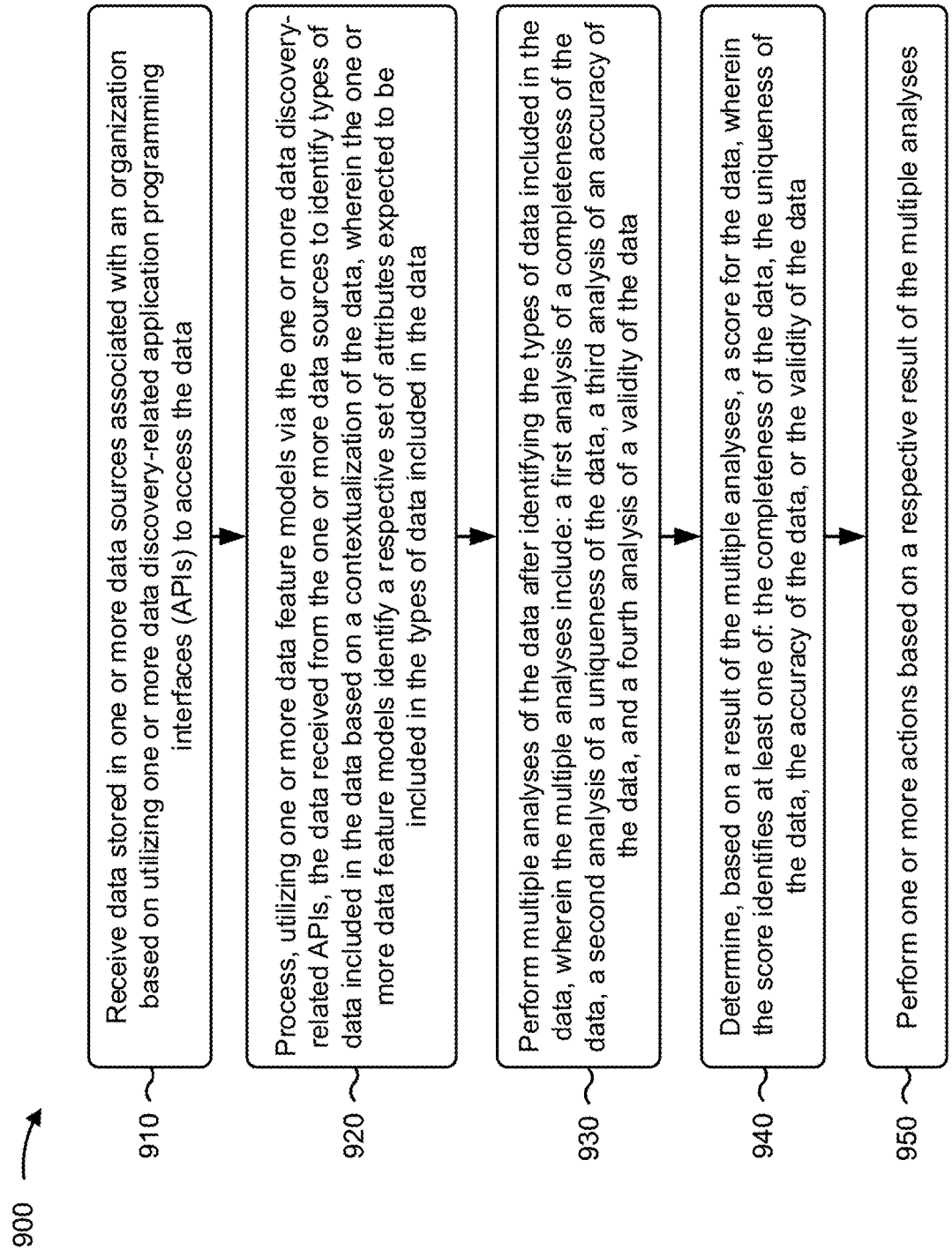

FIG. 9 is a flow chart of an example process 900 for processing data utilizing a corpus. In some implementations, one or more process blocks of FIG. 9 may be performed by a data intelligence platform (e.g., data intelligence platform 630). In some implementations, one or more process blocks of FIG. 9 may be performed by another device or a group of devices separate from or including the data intelligence platform, such as a client device (e.g., client device 610), a server device (e.g., server device 620), a computing resource (e.g., computing resource 634), and/or the like.

As shown in FIG. 9, process 900 may include receiving data stored in one or more data sources associated with an organization based on utilizing one or more data discovery-related application programming interfaces (APIs) to access the data (block 910). For example, the data intelligence platform (e.g., using computing resource 634, processor 720, communication interface 770, and/or the like) may receive data stored in one or more data sources associated with an organization based on utilizing one or more data discovery-related application programming interfaces (APIs) to access the data, as described elsewhere herein.

As further shown in FIG. 9, process 900 may include processing, utilizing one or more data feature models via the one or more data discovery-related APIs, the data received from the one or more data sources to identify types of data included in the data based on a contextualization of the data, wherein the one or more data feature models identify a respective set of attributes expected to be included in the types of data included in the data (block 920). For example, the data intelligence platform (e.g., using computing resource 634, processor 720, and/or the like) may process, utilizing one or more data feature models via the one or more data discovery-related APIs, the data received from the one or more data sources to identify types of data included in the data based on a contextualization of the data, as described elsewhere herein. In some implementations, the one or more data feature models identify a respective set of attributes expected to be included in the types of data included in the data.

As further shown in FIG. 9, process 900 may include performing multiple analyses of the data after identifying the types of data included in the data, wherein the multiple analyses include: a first analysis of a completeness of the data, a second analysis of a uniqueness of the data, a third analysis of an accuracy of the data, and a fourth analysis of a validity of the data (block 930). For example, the data intelligence platform (e.g., using computing resource 634, processor 720, and/or the like) may perform multiple analyses of the data after identifying the types of data included in the data, as described elsewhere herein. In some implementations, the multiple analyses include: a first analysis of a completeness of the data, a second analysis of a uniqueness of the data, a third analysis of an accuracy of the data, and a fourth analysis of a validity of the data.

As further shown in FIG. 9, process 900 may include determining, based on a result of the multiple analyses, a score for the data, wherein the score identifies at least one of: the completeness of the data, the uniqueness of the data, the accuracy of the data, or the validity of the data (block 940). For example, the data intelligence platform (e.g., using computing resource 634, processor 720, and/or the like) may determine, based on a result of the multiple analyses, a score for the data, as described elsewhere herein. In some implementations, the score identifies at least one of: the completeness of the data, the uniqueness of the data, the accuracy of the data, or the validity of the data.

As further shown in FIG. 9, process 900 may include performing one or more actions based on a respective result of the multiple analyses (block 950). For example, the data intelligence platform (e.g., using computing resource 634, processor 720, memory 730, storage component 740, output component 760, communication interface 770, and/or the like) may perform one or more actions based on a respective result of the multiple analyses, as described elsewhere herein.

Process 900 may include additional implementations, such as any single implementation or any combination of implementations described below and/or in connection with one or more other processes described elsewhere herein.

In some implementations, the data intelligence platform may determine a respective value for one or more metrics associated with the data based on the result of the multiple analyses, wherein the one or more metrics are related to the at least one of the completeness of the data, the uniqueness of the data, the accuracy of the data, or the validity of the data, and may determine the score for the data based on the respective value for the one or more metrics. In some implementations, the data intelligence platform may process the data by performing a comparison of first data features of the data and second data features included in the one or more data feature models after receiving the data, wherein the comparison is based on the contextualization of the data, and may identify the types of data included in the data based on a result of the comparison of the first data features and the second data features.

In some implementations, the data intelligence platform may generate a report based on the result of the multiple analyses, wherein the report includes information identifying the score, and may provide the report for display via a display after generating the report. In some implementations, the data intelligence platform may perform the multiple analyses utilizing at least one of: the one or more data feature models, one or more machine learning models, or one or more corpuses related to the data.

In some implementations, the score is based on the contextualization of the data to at least one of: the organization, an industry associated with the organization, or various industries or organizations. In some implementations, the data intelligence platform may modify the data based on the score and the contextualization to form modified data, and may provide the modified data to the one or more data sources to replace the data after modifying data.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
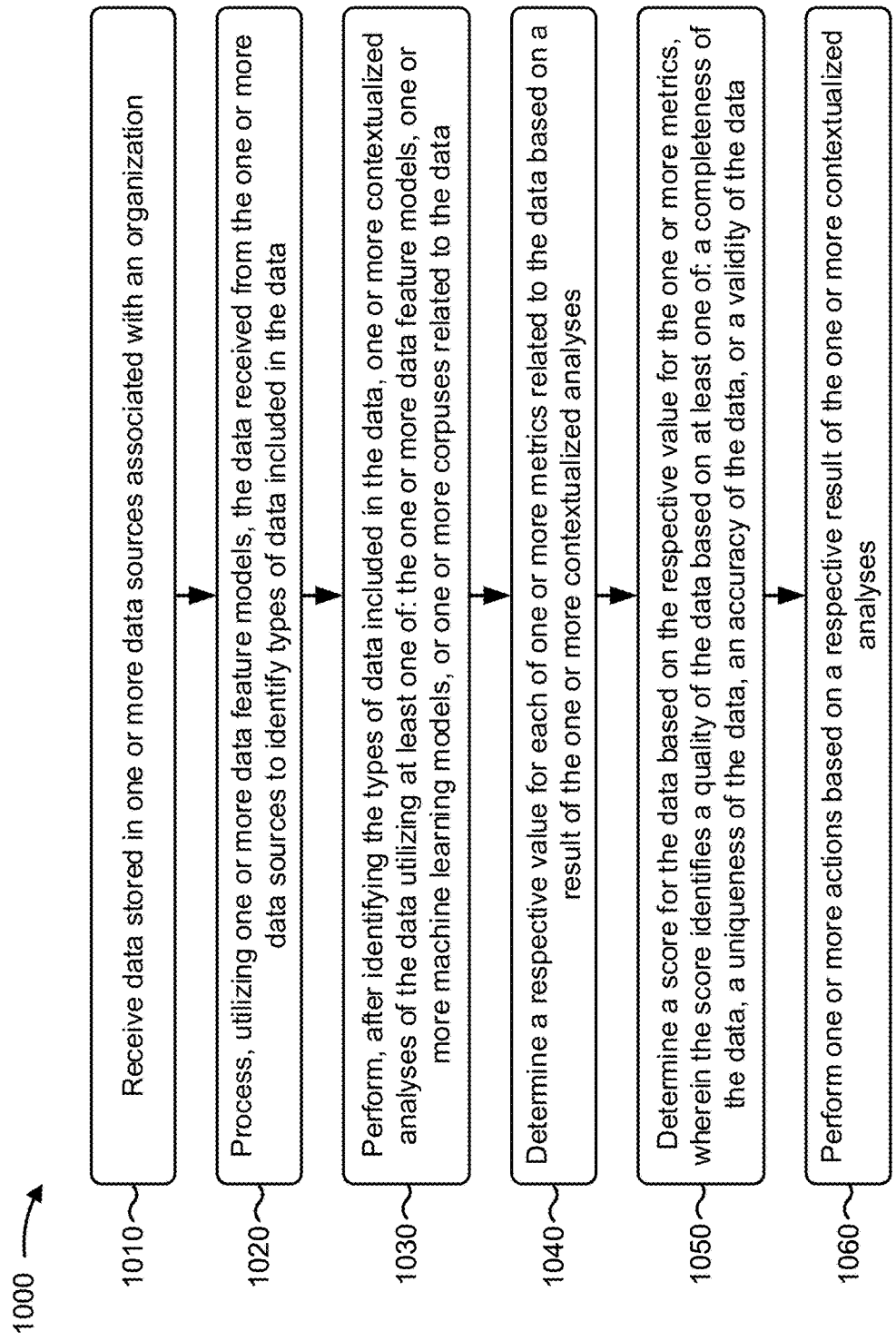

FIG. 10 is a flow chart of an example process 1000 for processing data utilizing a corpus. In some implementations, one or more process blocks of FIG. 10 may be performed by a data intelligence platform (e.g., data intelligence platform 630). In some implementations, one or more process blocks of FIG. 10 may be performed by another device or a group of devices separate from or including the data intelligence platform, such as a client device (e.g., client device 610), a server device (e.g., server device 620), a computing resource (e.g., computing resource 634), and/or the like.

As shown in FIG. 10, process 1000 may include receiving data stored in one or more data sources associated with an organization (block 1010). For example, the data intelligence platform (e.g., using computing resource 634, processor 720, communication interface 770, and/or the like) may receive data stored in one or more data sources associated with an organization, as described elsewhere herein.

As further shown in FIG. 10, process 1000 may include processing, utilizing one or more data feature models, the data received from the one or more data sources to identify types of data included in the data (block 1020). For example, the data intelligence platform (e.g., using computing resource 634, processor 720, and/or the like) may process, utilizing one or more data feature models, the data received from the one or more data sources to identify types of data included in the data, as described elsewhere herein.

As further shown in FIG. 10, process 1000 may include performing, after identifying the types of data included in the data, one or more contextualized analyses of the data utilizing at least one of: the one or more data feature models, one or more machine learning models, or one or more corpuses related to the data (block 1030). For example, the data intelligence platform (e.g., using computing resource 634, processor 720, and/or the like) may perform, after identifying the types of data included in the data, one or more contextualized analyses of the data utilizing at least one of: the one or more data feature models, one or more machine learning models, or one or more corpuses related to the data, as described elsewhere herein.

As further shown in FIG. 10, process 1000 may include determining a respective value for each of one or more metrics related to the data based on a result of the one or more contextualized analyses (block 1040). For example, the data intelligence platform (e.g., using computing resource 634, processor 720, and/or the like) may determine a respective value for each of one or more metrics related to the data based on a result of the one or more contextualized analyses, as described elsewhere herein.

As further shown in FIG. 10, process 1000 may include determining a score for the data based on the respective value for the each of the one or more metrics, wherein the score identifies a quality of the data based on at least one of: a completeness of the data, a uniqueness of the data, an accuracy of the data, or a validity of the data (block 1050). For example, the data intelligence platform (e.g., using computing resource 634, processor 720, and/or the like) may determine a score for the data based on the respective value for each of the one or more metrics, as described elsewhere herein. In some implementations, the score identifies a quality of the data based on at least one of: a completeness of the data, a uniqueness of the data, an accuracy of the data, or a validity of the data.

As further shown in FIG. 10, process 1000 may include performing one or more actions based on a respective result of the one or more contextualized analyses (block 1060). For example, the data intelligence platform (e.g., using computing resource 634, processor 720, memory 730, storage component 740, output component 760, communication interface 770, and/or the like) may perform one or more actions based on a respective result of the one or more contextualized analyses, as described elsewhere herein.

Process 1000 may include additional implementations, such as any single implementation or any combination of implementations described below and/or in connection with one or more other processes described elsewhere herein.

In some implementations, the data intelligence platform may generate a set of recommendations for the data related to modifying the score associated with the data after performing the one or more contextualized analyses, wherein the set of recommendations is contextualized to at least one of: the organization, an industry associated with the organization, or various industries or organizations, and after generating the set of recommendations: may provide information that identifies the set of recommendations for display via a display, or may modify the data according to the set of recommendations to modify the score. In some implementations, the data intelligence platform may access the data stored in the one or more data sources utilizing a backend-as-a-service (BaaS) application programming interface (API), and may receive the data after accessing the data utilizing the BaaS API.

In some implementations, the one or more machine learning models include at least one of: a pattern matching machine learning model, a fuzzy logic machine learning model, or a fuzzy natural language processing machine learning model. In some implementations, the data intelligence platform may process the data by performing a comparison of first data features of the data and second data features included in the one or more data feature models after receiving the data, and may identify the types of data included in the data based on a result of the comparison of the first data features and the second data features. In some implementations, the data intelligence platform may perform, after identifying the types of data included in the data and utilizing the one or more corpuses, at least one of: a first contextualized analysis of the completeness of the data, a second contextualized analysis of the uniqueness of the data, a third contextualized analysis of the accuracy of the data, or a fourth contextualized analysis of the validity of the data.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    accessing, by a device and utilizing a backend-as-a-service (BaaS) platform application programming interface (API), one or more data sources associated with an organization;
    receiving, by the device and utilizing the BaaS platform, data stored in the one or more data sources after accessing the one or more data sources including one or more corpuses associated with the data stored in a knowledge graph;
    processing, by the device and utilizing one or more data feature models, the data received from the one or more data sources to identify types of data included in the data based on a contextualization of the data to at least one of:
        the organization,
        an industry associated with the organization, or
        various industries or organizations;
    portioning, by the device, a set of data from an enterprise data storage associated with the organization into a training set, a validation set, and a test set;
    training, by the device, one or more machine learning models based on the training set;
    performing, by the device and after identifying the types of data included in the data, multiple analyses of the data utilizing the one or more corpuses and:
        the one or more data feature models, and
        the one or more machine learning models,
        wherein the one or more corpuses include information that identifies formatting rules associated with the data, value ranges associated with the data, tolerances associated with the data, and expected data elements that are expected to be included in the data,
        wherein the multiple analyses include:
            a first analysis of a completeness of the data to determine whether data elements are missing from the data based on the expected data elements,
            a second analysis of a uniqueness of the data,
            a third analysis of an accuracy of the data based on the tolerances and the value ranges, and
            a fourth analysis of a validity of the data based on the formatting rules, and
        wherein performing the multiple analyses comprises:
            performing binary recursive partitioning to split the data into partitions or branches, and
            determining, based on the partitions or the branches, results of the multiple analyses; and
    performing, by the device, one or more actions based on a respective result of the results of the multiple analyses.

2. The method of claim 1, wherein the one or more data feature models identify a respective set of attributes expected to be included in the types of data included in the data based on the contextualization of the data to the at least one of the organization, the industry, or the various industries or organizations.

3. The method of claim 1, wherein the one or more corpuses include at least one of:
    a common corpus related to the various industries or organizations,
    an industry corpus related to the industry associated with the organization, or
    an organization corpus related to the organization.

4. The method of claim 1, wherein the one or more corpuses are stored in the knowledge graph associated with the device.

5. The method of claim 1, further comprising:
    selecting, based on the contextualization, the one or more data feature models to use to process the data; and
    wherein processing the data comprises:
        processing, after selecting the one or more data feature models, the data by performing a comparison of first data features of the data and second data features included in the one or more data feature models; and identifying the types of data included in the data based on a result of the comparison of the first data features and the second data features.

6. The method of claim 1, further comprising:

selecting a questionnaire, from a set of questionnaires stored in a data source associated with the device, to be provided to an individual associated with the organization, wherein the questionnaire is based on the contextualization of the data;

processing, utilizing a natural language processing technique, a respective response to one or more questions associated with the questionnaire after selecting the questionnaire, wherein the respective response includes at least one of:

text input to a user interface, selection of a user interface element of the user interface, or audio input to an input component associated with the device; and wherein performing the multiple analyses comprises:

performing the multiple analyses after processing the respective response utilizing the natural language processing technique.

7. The method of claim 1, further comprising:

determining separate scores for the first analysis, the second analysis, the third analysis, and the fourth analysis after performing the multiple analyses, wherein the separate scores identify the completeness, the uniqueness, the accuracy, and the validity of the data; and wherein performing the one or more actions comprises:

performing the one or more actions based on the separate scores.

8. A device, comprising:

one or more memories; and one or more processors, communicatively coupled to the one or more memories, to:

receive data stored in one or more data sources associated with an organization based on utilizing one or more data discovery-related application programming interfaces (APIs) to access the data including one or more corpuses associated with the data stored in a knowledge graph;

portion a set of data from an enterprise data storage associated with the organization into a training set, a validation set, and a test set;

train one or more machine learning models based on the training set;

process, utilizing one or more data feature models via the one or more data discovery-related APIs, the data received from the one or more data sources to identify types of data included in the data based on a contextualization of the data, wherein the one or more data feature models identify a respective set of attributes expected to be included in the types of data included in the data;

perform, using the one or more machine learning models, multiple analyses of the data after identifying the types of data included in the data utilizing the one or more corpuses, wherein the one or more corpuses include information that identifies formatting rules associated with the data, value ranges associated with the data, tolerances associated with the data, and expected data elements that are expected to be included in the data, and wherein the multiple analyses include:

a first analysis of a completeness of the data to determine whether data elements are missing from the data based on the expected data elements, a second analysis of a uniqueness of the data, a third analysis of an accuracy of the data based on the tolerances and the value ranges, and a fourth analysis of a validity of the data based on the formatting rules, and wherein the one or more processors, to perform the multiple analyses, are configured to:

perform binary recursive partitioning to split the data into partitions or branches, and determine, based on the partitions or the branches, results of the multiple analyses;

determine, based on a result of the multiple analyses, a score for the data, wherein the score identifies at least one of:

the completeness of the data, the uniqueness of the data, the accuracy of the data, or the validity of the data; and perform one or more actions based on a respective result, of the results of the multiple analyses.

9. The device of claim 8, wherein the one or more processors are further to:

determine a respective value for one or more metrics associated with the data based on the result of the multiple analyses, wherein the one or more metrics are related to the at least one of the completeness of the data, the uniqueness of the data, the accuracy of the data, or the validity of the data; and wherein the one or more processors, when determining the score, are to:

determine the score for the data based on the respective value for the one or more metrics.

10. The device of claim 8, wherein the one or more processors, when processing the data, are to:

process the data by performing a comparison of first data features of the data and second data features included in the one or more data feature models after receiving the data, wherein the comparison is based on the contextualization of the data; and identify the types of data included in the data based on a result of the comparison of the first data features and the second data features.

11. The device of claim 8, wherein the one or more processors, when performing the one or more actions, are to:

generate a report based on the result of the multiple analyses, wherein the report includes information identifying the score; and provide the report for display via a display after generating the report.

12. The device of claim 8, wherein the one or more processors, when performing the multiple analyses, are to:

perform the multiple analyses utilizing the one or more data feature models.

13. The device of claim 8, wherein the score is based on the contextualization of the data to at least one of:
the organization,
an industry associated with the organization, or
various industries or organizations.

14. The device of claim 8, wherein the one or more processors, when performing the one or more actions, are to:
modify the data based on the score and the contextualization to form modified data; and
provide the modified data to the one or more data sources to replace the data after modifying data.

15. A non-transitory computer-readable medium storing instructions, the instructions comprising:
one or more instructions that, when executed by one or more processors, cause the one or more processors to:
receive data stored in one or more data sources associated with an organization;
portion a set of data from an enterprise data storage associated with the organization into a training set, a validation set, and a test set;
train one or more machine learning models based on the training set;
process, utilizing one or more data feature models, the data received from the one or more data sources to identify types of data included in the data including one or more corpuses associated with the data stored in a knowledge graph;
perform, after identifying the types of data included in the data, one or more contextualized analyses of the data utilizing the one or more corpuses and:
the one or more data feature models, and
the one or more machine learning models,
wherein the one or more corpuses include information that identifies formatting rules associated with the data, value ranges associated with the data, tolerances associated with the data, and expected data elements that are expected to be included in the data, and
wherein the one or more contextualized analyses include:
a first contextualized analysis of a completeness of the data to determine whether data elements are missing from the data based on the expected data elements,
a second contextualized analysis of a uniqueness of the data,
a third contextualized analysis of an accuracy of the data based on the tolerances and the value ranges, and
a fourth contextualized analysis of a validity of the data based on the formatting rules, and
wherein the one or more instructions, that cause the one or more processors to perform the one or more contextualized analyses, cause the one or more processors to:
perform binary recursive partitioning to split the data into partitions or branches, and
determine, based on the partitions or the branches, results of the one or more contextualized analyses;
determine a respective value for each of one or more metrics related to the data based on a result of the one or more contextualized analyses;
determine a score for the data based on the respective value for the each of the one or more metrics,
wherein the score identifies a quality of the data based on at least one of:
a completeness of the data,
a uniqueness of the data,
an accuracy of the data, or
a validity of the data; and
perform one or more actions based on a respective result of the results of the one or more contextualized analyses.

16. The non-transitory computer-readable medium of claim 15, wherein the one or more instructions, that cause the one or more processors to perform the one or more actions, cause the one or more processors to:
generate a set of recommendations for the data related to modifying the score associated with the data after performing the one or more contextualized analyses,
wherein the set of recommendations is contextualized to at least one of:
the organization,
an industry associated with the organization, or
various industries or organizations; and
after generating the set of recommendations:
provide information that identifies the set of recommendations for display via a display, or
modify the data according to the set of recommendations to modify the score.

17. The non-transitory computer-readable medium of claim 15, wherein the one or more instructions, when executed by the one or more processors, further cause the one or more processors to:
access the data stored in the one or more data sources utilizing a backend-as-a-service (BaaS) application programming interface (API); and
wherein the one or more instructions, that cause the one or more processors to receive the data, cause the one or more processors to:
receive the data after accessing the data utilizing the BaaS API.

18. The non-transitory computer-readable medium of claim 15, wherein the one or more machine learning models include at least one of:
a pattern matching machine learning model,
a fuzzy logic machine learning model, or
a fuzzy natural language processing machine learning model.

19. The non-transitory computer-readable medium of claim 15, wherein the one or more instructions, that cause the one or more processors to process the data, cause the one or more processors to:
process the data by performing a comparison of first data features of the data and second data features included in the one or more data feature models after receiving the data; and
identify the types of data included in the data based on a result of the comparison of the first data features and the second data features.

20. The non-transitory computer-readable medium of claim 15, wherein the one or more instructions, that cause the one or more processors to perform the one or more contextualized analyses, cause the one or more processors to:
perform, after identifying the types of data included in the data and utilizing the one or more corpuses, at least one of:
the first contextualized analysis of the completeness of the data, the second contextualized analysis of the uniqueness of the data,
the third contextualized analysis of the accuracy of the data, or
the fourth contextualized analysis of the validity of the data.

* * * * *